(12) United States Patent
Jessie, Jr.

(10) Patent No.: US 10,479,189 B2
(45) Date of Patent: Nov. 19, 2019

(54) MOTOR DRIVE SELECTOR MECHANISM FOR A CHILD VEHICLE

(71) Applicant: Huffy Corporation, Centerville, OH (US)

(72) Inventor: Donald K. Jessie, Jr., Middletown, OH (US)

(73) Assignee: Huffy Corporation, Miamisburg, OH (US)

(*) Notice: Subject to any disclaimer, the term of this patent is extended or adjusted under 35 U.S.C. 154(b) by 447 days.

(21) Appl. No.: 15/064,005

(22) Filed: Mar. 8, 2016

(65) Prior Publication Data

US 2016/0263988 A1    Sep. 15, 2016

Related U.S. Application Data

(60) Provisional application No. 62/130,017, filed on Mar. 9, 2015.

(51) Int. Cl.
 *B60K 7/00* (2006.01)
 *B60L 50/00* (2019.01)

(52) U.S. Cl.
 CPC ............ *B60K 7/0007* (2013.01); *B60L 50/00* (2019.02); *B60L 2200/20* (2013.01); *B60L 2220/50* (2013.01); *Y02T 10/641* (2013.01)

(58) Field of Classification Search
 CPC ........ A63C 17/12; B62D 51/02; B62K 3/002; B62K 2202/00; B62K 7/00; B62K 7/0007; B62K 7/0038; B62K 7/0061; B62K 7/0092; B62M 6/40; B62M 6/45; B62M 6/65; B62L 2202/00; F16D 11/16
 See application file for complete search history.

(56) References Cited

U.S. PATENT DOCUMENTS

| | | | | |
|---|---|---|---|---|
| 2,874,814 A * | 2/1959 | Da Ruben | .......... | B60K 17/3515 192/65 |
| 2,948,557 A * | 8/1960 | Howe | ...................... | F16D 11/10 192/69.43 |
| 3,125,363 A * | 3/1964 | Kapusta | ............. | B60K 17/3515 192/69.43 |
| 3,184,258 A * | 5/1965 | Kapusta | ............. | B60K 17/3515 192/108 |
| 3,351,364 A * | 11/1967 | Warn | ...................... | F16D 11/14 192/69.43 |
| 3,538,640 A | 11/1970 | Hayes et al. | | |
| 3,889,773 A * | 6/1975 | Chant | ...................... | B62M 7/12 180/65.22 |
| 4,291,791 A * | 9/1981 | Goto | ...................... | F16D 11/14 192/110 B |
| 4,399,883 A | 8/1983 | Todokoro | | |
| 4,475,618 A | 10/1984 | Kennedy | | |

(Continued)

*Primary Examiner* — Katy M Ebner
(74) *Attorney, Agent, or Firm* — Wood Herron & Evans LLP

(57) ABSTRACT

In one aspect, a child vehicle is provided comprising a motor, a wheel selectively operatively coupled to the motor for driving the child vehicle under the power of the motor, and a motor drive selector mechanism. The motor drive selector mechanism allows the child vehicle to be operated in a first operational mode wherein the wheel is driven by the motor and a second operational mode wherein the wheel is substantially free from drag or resistance due to the motor. A method of operating the child vehicle is also provided.

27 Claims, 15 Drawing Sheets

(56) References Cited

U.S. PATENT DOCUMENTS

| | | | |
|---|---|---|---|
| 4,484,649 A | 11/1984 | Kennedy | |
| 4,504,094 A * | 3/1985 | Burrows | A61G 5/045 192/69.43 |
| 4,512,613 A * | 4/1985 | Nassiri | A61G 5/045 180/907 |
| 4,540,380 A | 9/1985 | Kennedy | |
| 4,555,197 A * | 11/1985 | Erickson | F16D 11/14 192/69.43 |
| 4,560,022 A * | 12/1985 | Kassai | A63G 25/00 180/336 |
| 4,573,943 A | 3/1986 | Kennedy | |
| 4,610,558 A * | 9/1986 | Erickson | F16D 11/14 192/69.43 |
| 4,643,695 A | 2/1987 | Kennedy et al. | |
| 4,696,382 A * | 9/1987 | Aho | B60K 17/26 192/69.43 |
| 4,773,495 A * | 9/1988 | Haubenwallner | A61G 5/045 180/6.5 |
| 5,135,063 A * | 8/1992 | Kropf | A61G 5/047 180/13 |
| 5,237,302 A | 8/1993 | Harris | |
| 5,394,968 A * | 3/1995 | Yu-Shu | F16D 11/14 192/69.4 |
| 5,497,844 A | 3/1996 | Fritzinger | |
| 5,699,869 A | 12/1997 | Fritzinger | |
| 5,859,509 A | 1/1999 | Bienz | |
| 5,988,304 A * | 11/1999 | Behrendts | A61G 5/042 180/11 |
| 6,206,751 B1 * | 3/2001 | Lee | A63H 17/12 446/431 |
| 6,273,205 B1 * | 8/2001 | Tsai | B62K 3/002 180/181 |
| 6,302,226 B1 * | 10/2001 | Kanno | A61G 5/02 180/6.5 |
| 6,343,667 B2 * | 2/2002 | Sauve | B62D 61/02 180/181 |
| 6,364,736 B1 | 4/2002 | Lee | |
| 6,386,304 B1 | 5/2002 | Wang | |
| 6,394,213 B1 * | 5/2002 | Tsai | B62K 3/002 180/181 |
| 6,464,029 B2 | 10/2002 | Gu | |
| 6,523,661 B1 * | 2/2003 | Bussinger | F16D 11/14 180/65.1 |
| 6,634,452 B2 * | 10/2003 | Cheng | B62K 3/002 180/220 |
| 6,874,587 B2 | 4/2005 | Wang | |
| 7,673,715 B2 * | 3/2010 | Takechi | H02K 7/1166 180/65.6 |
| 8,141,668 B2 * | 3/2012 | Huntsberger | B60L 11/1805 180/65.1 |
| 8,668,546 B2 | 3/2014 | Rudell | |
| 9,474,985 B2 | 10/2016 | Huang | |
| 2002/0092692 A1 * | 7/2002 | Chen | B62K 3/002 180/220 |
| 2002/0096380 A1 * | 7/2002 | Lai | B62K 3/002 180/181 |
| 2004/0003952 A1 * | 1/2004 | McGovern | B62M 6/45 180/220 |
| 2005/0067207 A1 * | 3/2005 | Radtke | B62M 6/45 180/223 |
| 2006/0266570 A1 * | 11/2006 | Roth | B62K 3/002 180/208 |
| 2009/0156094 A1 | 6/2009 | Seekel | |
| 2013/0095971 A1 * | 4/2013 | Hino | B62M 11/04 475/5 |
| 2013/0263696 A1 * | 10/2013 | Schneider | B62M 6/60 74/625 |
| 2016/0296848 A1 | 10/2016 | Taylor et al. | |
| 2018/0072381 A1 * | 3/2018 | Guida | B63B 25/002 |
| 2018/0133075 A1 * | 5/2018 | Jacobsson | A61G 5/045 |
| 2018/0134339 A1 * | 5/2018 | Werner | B62M 11/18 |
| 2018/0154771 A1 * | 6/2018 | Orimo | B60K 17/08 |

* cited by examiner

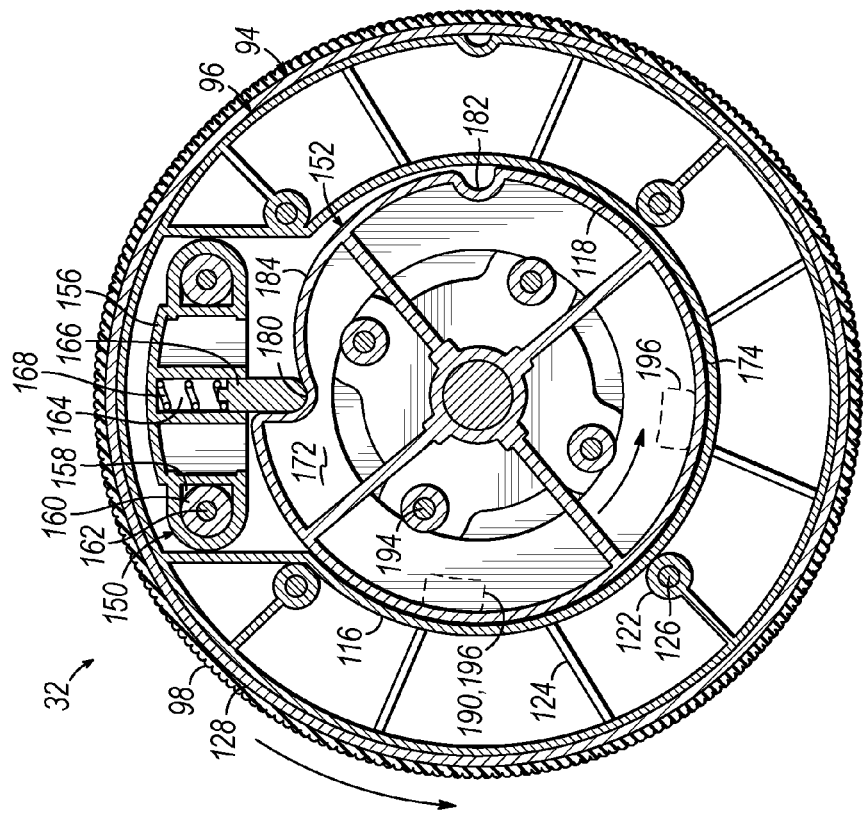
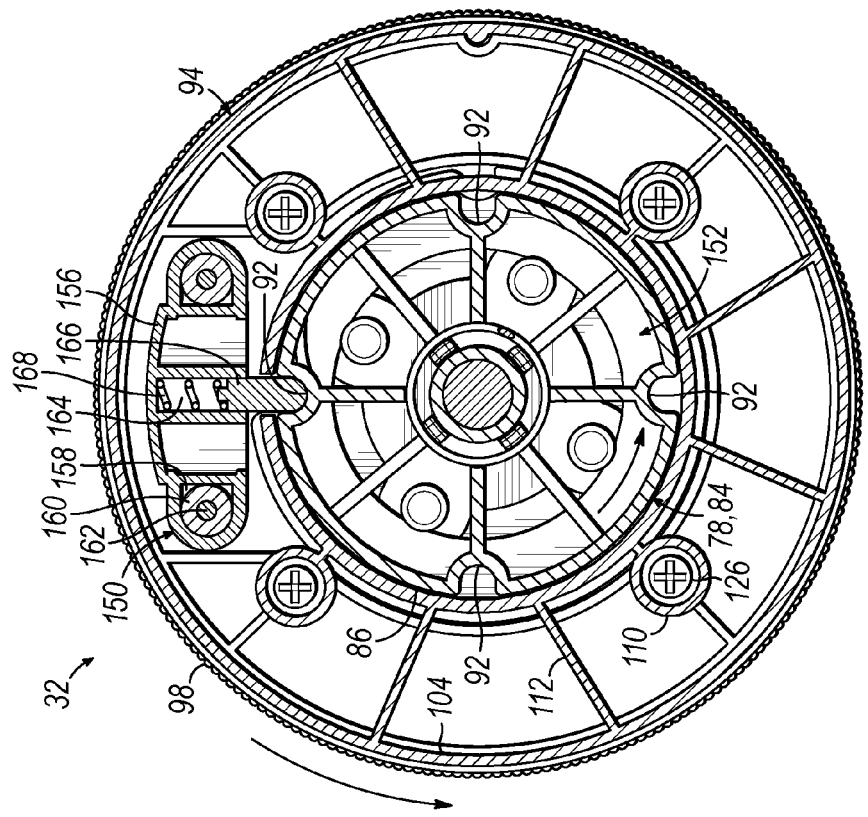

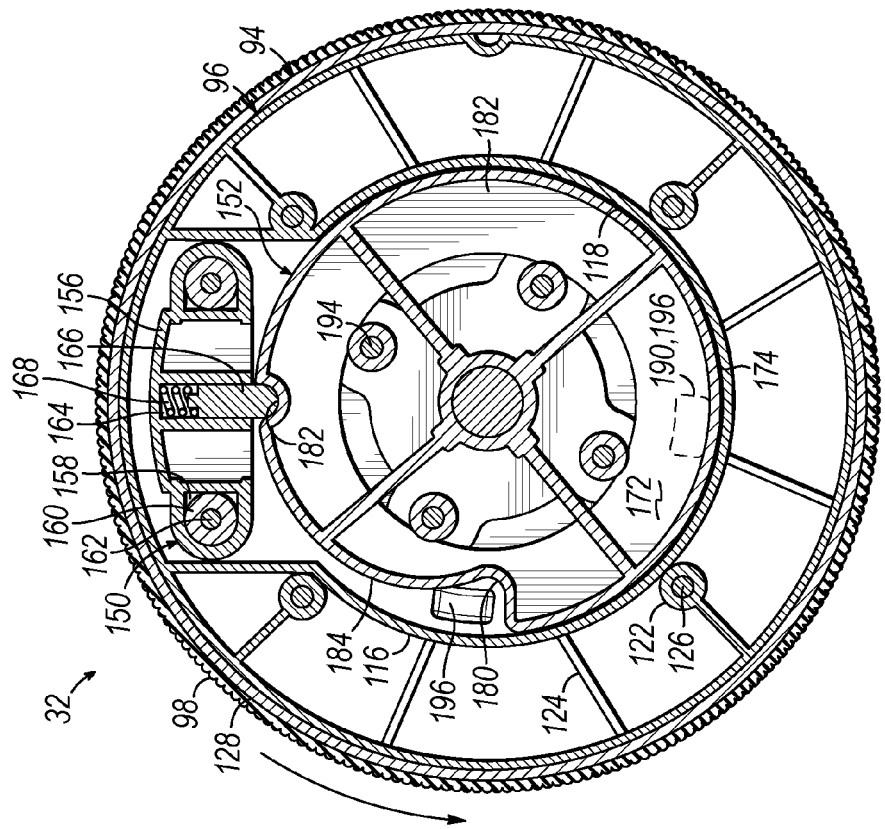
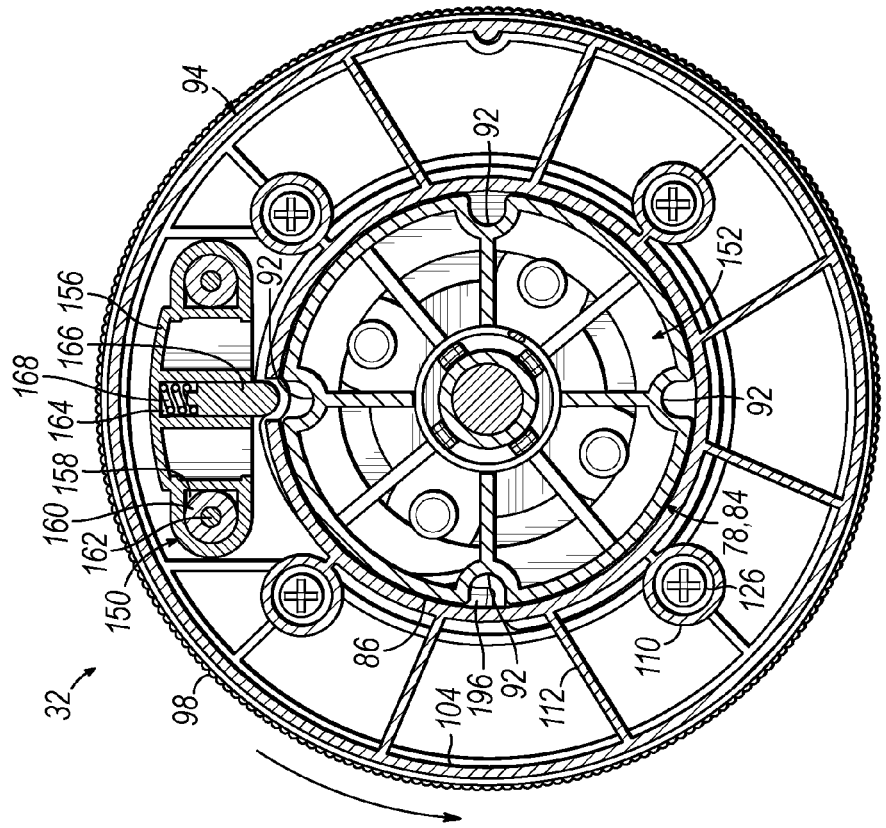

MOTOR DRIVE SELECTOR MECHANISM FOR A CHILD VEHICLE

TECHNICAL FIELD

The invention relates to a child vehicle, and more particularly to a child vehicle having a motor drive selector mechanism that allows the vehicle to be selectively driven by the motor in a first operational mode and disengaged from the motor, and thus free of motor drag or resistance, in a second operational mode.

BACKGROUND

Child vehicles, including a wide range of tricycles, quads, scooters and the like, remain very popular with consumers. Traditionally, these child vehicles were self propelled, in that the rider of the vehicle typically provides the motive force that results in movement of the vehicle in a direction dictated by the handlebar or steering mechanism. These self-propelled vehicles might take the form of pedaled vehicles, such as traditional tricycles, or foot-powered vehicles, such as traditional scooters or foot-to-floor vehicles. More recently, however, consumers have found motorized vehicles an attractive alternative to self-propelled vehicles. These types of vehicles typically include an electric motor operatively coupled to one or more of the vehicle wheels for providing the motive force resulting in movement of the vehicle. Such motorized vehicles include a power source, such as a battery, for providing power to the electric motor. The battery is usually of a rechargeable type that allows the battery to be recharged by coupling the battery to an electric outlet, via a power cord or the like, over a certain period of time.

While motorized child vehicles have gained in popularity over the last several years, these vehicles have a number of drawbacks that limit their full acceptance in the commercial landscape. By way of example, the batteries used to power the electric motors are typically heavy and cumbersome to use. In this regard, a recharging operation may require the battery to be removed from the vehicle prior to charging. This may require the owner to perform several disassembly steps and lifting operations to achieve battery removal. Additionally, battery life for such motorized vehicles is often relatively short. For example, a typical battery may power a vehicle for as short as a few hours. Moreover, in contrast to useable battery life, the recharge time of these batteries is relatively long. For example, in many cases, the battery would need to be charged for several hours to reach a fully-charged state. Many users charge the battery overnight in anticipation of use the following day. In many cases, however, owners forget to plug the battery in during the overnight period, perhaps resulting in frustration and disappointment.

Another drawback of motorized vehicles is that once the battery is depleted, and the motor no longer propels the vehicle, children tend not to use the vehicle for further play and enjoyment. In this regard, the vehicle will often be left abandoned in the yard, porch or garage until an adult recharges the battery. Accordingly, the available play time of the vehicle is limited, reducing the overall enjoyment factor of the vehicle. In an attempt to extend the play time of motorized vehicles, some vehicles are configured to be used in a traditional sense after the battery life has been depleted. However, the drive train of these vehicles, such as one or more of the wheels, remains engaged with the motor such that movement of the vehicle has to work against the motor (often associated with an audible motor "whining"). This results in a significant drag or resistance due to the motor that may make it difficult to move the vehicle under pedal power or foot power. Consequently, these vehicles remain difficult to use, and are often not used, after the battery life has been depleted.

Accordingly, there is a need for an improved motorized child vehicle that allows the vehicle to be more effectively used in a traditional sense after the battery life has been depleted.

SUMMARY

In one aspect, a child vehicle is provided comprising a motor, a wheel selectively operatively coupled to the motor for driving the child vehicle under the power of the motor, and a motor drive selector mechanism. The motor drive selector mechanism allows the child vehicle to be operated in a first operational mode wherein the wheel is driven by the motor and a second operational mode wherein the wheel is substantially free from drag or resistance due to the motor. The child vehicle may be, for example, one of a tricycle or a scooter.

In one embodiment, the motor includes a drive wheel and the motor drive selector mechanism comprises a drive adaptor including a first portion engaged with the drive wheel and a second portion extending toward the interior of the wheel. The motor drive selector mechanism further comprises a lock pin assembly operable to rotate with the wheel and having a lock pin movable between an extended position and a retracted position, and a selector plate movable between a first motor driven position and a second motor disengaged position. A control knob is provided for moving the selector plate between the first and second positions. Movement of the selector plate may move the lock pin between the extended and retracted positions. In addition or alternatively, the lock pin may be biased toward the extended position.

In one embodiment, the selector plate is positioned within the wheel. In addition or alternatively, the control knob may extend outside of the wheel.

In another embodiment, the child vehicle further comprises a lock mechanism for locking the selector plate in the first and second positions. For example, the lock mechanism may include a protrusion extending from a surface of the selector plate for engaging with a recess operable to rotate with the wheel.

In one embodiment, the selector plate includes first and second spaced apart recesses for engaging with the lock pin, and the first recess has a depth greater than a depth of the second recess such that the lock pin is in the extended position when in the first recess and the lock pin is in the retracted position when in the second recess. The selector plate may further include a cam surface extending between the first and second recesses for facilitating movement of the lock pin between the extended and retracted positions.

In another embodiment, the second portion of the drive adaptor includes a plurality of recesses, and the lock pin extends into one of the recesses when the selector plate is in the motor driven position.

In yet another embodiment, the child vehicle further comprises a canister positioned internal the wheel and coupled thereto so as to rotate with the wheel, and the lock pin assembly is coupled to the canister. The lock pin assembly and selector plate may be arranged within the canister.

In another aspect, a method of operating a child vehicle having a first operational mode wherein the vehicle is powered by a motor, a second operational mode, and a motor drive selector mechanism for changing the operational mode of the vehicle comprises operating the child vehicle in the first operational mode when the motor drive selector mechanism is in a first state, changing the motor drive selector mechanism from the first state to a second state, and operating the child vehicle in the second operational mode when the motor drive selector mechanism is in the second state. When in the second operational mode, the vehicle is not being powered by the motor and the vehicle may operate without substantially any drag or resistance from the motor.

In one embodiment, the motor drive selector mechanism includes a drive adaptor including a plurality of recesses, a lock pin assembly operable to rotate with the wheel and having a lock pin movable between an extended position and a retracted position, and a selector plate movable between a first motor driven position and a second motor disengaged position. Changing the motor drive selector mechanism from the first state to a second state includes moving the selector plate from the first position to the second position, which may move the lock pin from the extended position to the retracted position. For example, moving the selector plate from the first position to the second position may guide the lock pin along a cam surface of the selector plate from a first recess to a second recess. In addition or alternatively, the motor drive selector mechanism may further include a drive adaptor including a plurality of recesses, and moving the selector plate from the first position to the second position may remove the lock pin from one of the recesses of the drive adaptor.

In another aspect, a child vehicle has a motor-driven operational mode and a non-motor-driven operational mode and a motor drive selector mechanism for selectively changing between the operational modes. In the non-motor-driven operational mode, the vehicle operates with substantially no drag or resistance due to the motor.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 6A is a cross-sectional view of the wheel of FIG. 6 taken generally along line 6A-6A;

FIG. 6B is a cross-sectional view of the wheel of FIG. 6 taken generally along line 6B-6B;

FIG. 8A is a cross-sectional view of the wheel of FIG. 8 taken generally along line 8A-8A;

FIG. 8B is a cross-sectional view of the wheel of FIG. 7 taken generally along line 8B-8B;

DETAILED DESCRIPTION

Figure 1:
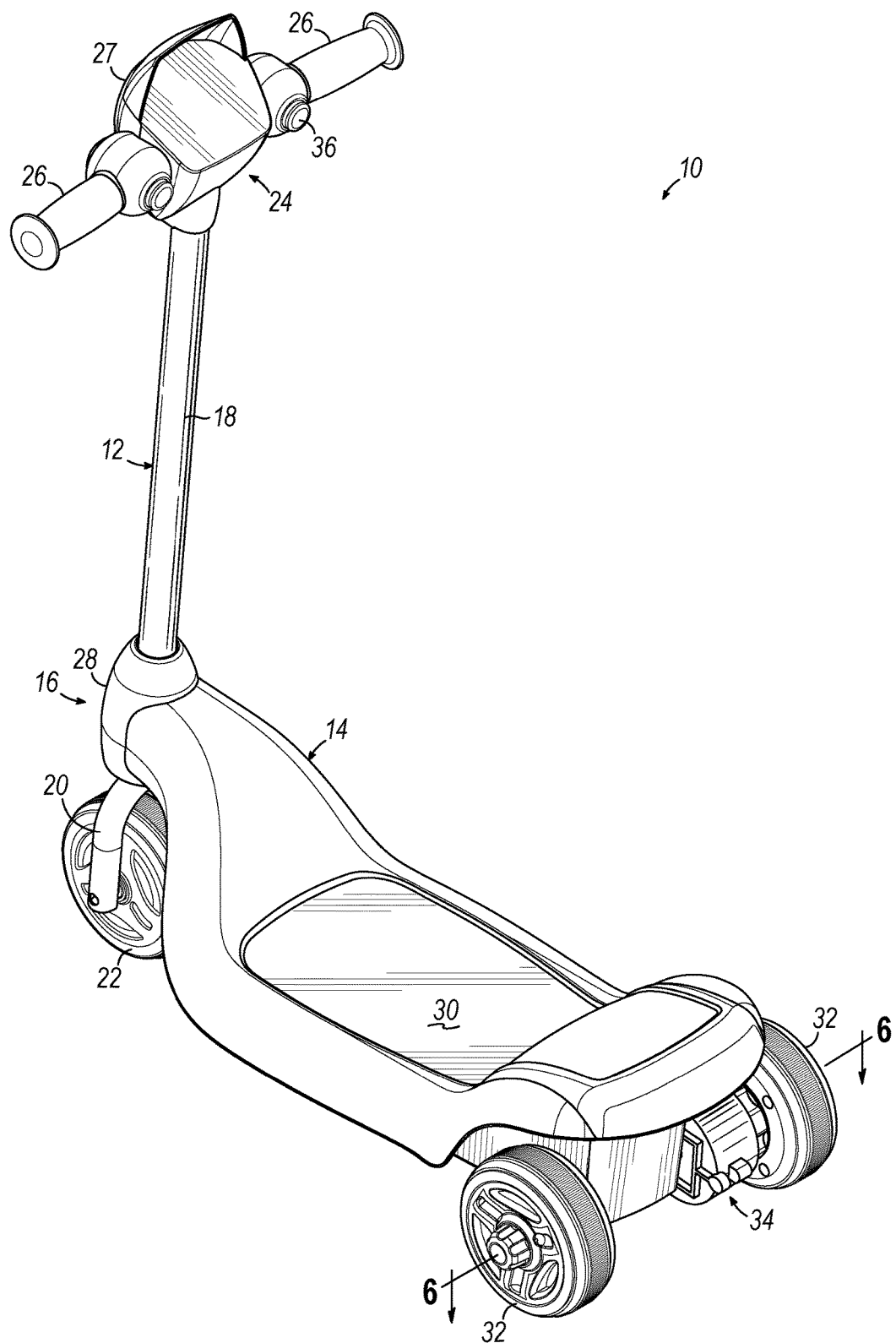
FIG. 1 is a perspective view of one embodiment of the invention configured as a scooter.
Figure 2:
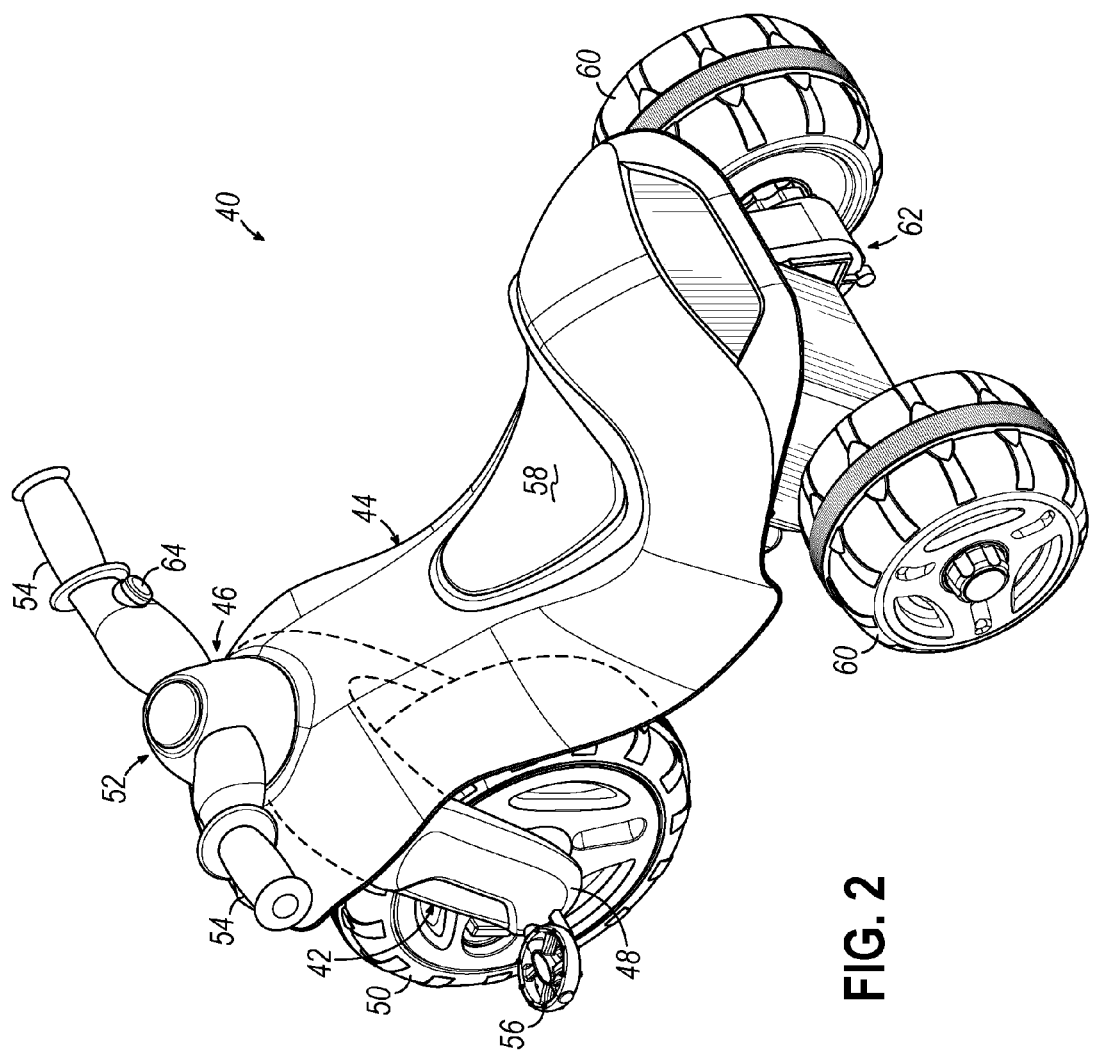
FIG. 2 is a perspective view of another embodiment of the invention configured as a tricycle.

Referring now to the drawings, FIGS. 1 and 2 illustrate exemplary embodiments of a child vehicle in accordance with aspects of the present invention. In this regard, FIG. 1 illustrates a motorized scooter 10 in accordance with an embodiment of the invention. The scooter 10 includes a first frame 12 operatively coupled to a second frame 14 at a joint 16. The joint 16 is configured such that the first frame 12 is rotatable relative to the second frame 14. The first frame 12 includes an elongate steering tube 18 having a fork 20 at one end thereof for receiving a front wheel 22 and a steering assembly 24 at the other end thereof. The steering assembly 24 may include grips 26 to be used by the rider for turning the front wheel 22, and thereby guiding the scooter 10 in a desired direction. The steering assembly 24 may further include a headpiece 27 that provides some desired function, such as sounds, lights, storage compartment, etc., or provides an ornamental aspect to the scooter 10.

The second frame 14 includes a head tube 28 configured to rotatably receive the steering tube 18, a deck 30 for supporting the rider, and a pair or rear wheels 32. As noted above, the scooter 10 is configured as a motor-powered vehicle. Accordingly, the second frame 14 further includes a motor 34 for providing a motive force for moving the scooter 10 in a direction dictated by the first frame 12, and the steering assembly 24 in particular. In an exemplary embodiment, the motor 34 may be an electric motor, but the invention is not so limited, as other types of motors may also be used. As electric motors, and other possible motors, are well understood in the art and commercially available, the details of the motor 34 will not be further described herein. It is understood that the motor 34 is operatively coupled to one or more of the rear wheels 32 for driving the scooter 10. In an exemplary embodiment, the motor 34 is operatively coupled to only one of the rear wheels 32 (referred to as a driven wheel). Although not shown, the motor 34 may be coupled to a battery, such as a rechargeable battery, for providing power to the motor 34.

In use, when the battery is charged and operational, a rider may selectively engage a switch 36 on steering assembly 24 for providing power to the motor 34 and causing the driven wheel 32 to turn and propel the scooter 10. This motor driven state represents a first operational mode of the scooter 10. The switch 36 may take a wide variety of forms, including a lever, a button, a rotating grip, or other types of switches known in the art. The scooter 10 may be operated in this first mode until the battery is substantially depleted of power, at which point there is insufficient power to operate the motor 34 and turn the driven wheel 32.

In accordance with an aspect of the invention, the scooter 10, and more particularly the driven wheel 32, is configured to be disengaged from the motor 34 such that the scooter 10 may be operated in a traditional sense without being subjected to significant motor drag or resistance. In the instant embodiment, the scooter 10 is configured to be self-propelled by foot power in a second operational mode of the scooter 10 without being subjected to significant motor drag or resistance. In this regard, the scooter 10 includes a motor drive selector mechanism that allows the scooter 10 to be selectively operated in the first operational mode (motor powered) or the second operational mode (foot powered). The motor drive selector mechanism is fully described in detail below.

However, before describing the motor drive selector mechanism in detail, it should be recognized that another embodiment of the present invention may include a motorized tricycle. Referring to FIG. 2, a motorized tricycle 40 includes a first frame 42 operatively coupled to a second frame 44 at a joint 46. The joint 46 is configured such that the first frame 42 is rotatable relative to the second frame 44. The first frame 42 includes an elongate steering tube (not shown) having a fork 48 at one end thereof for receiving a front wheel 50 and a steering assembly 52 at the other end thereof. The steering assembly 52 may include grips 54 to be used by the rider for turning the front wheel 50, thereby guiding the tricycle 40 in a desired direction. The first frame 42 may further include a pair of pedals 56 (one shown) operatively coupled to the front wheel 50 such that rotation of the pedals 56 rotates the front wheel 50. The pedals 56 may be operatively coupled to the front wheel 50 in a direct drive arrangement, wherein rotation of the front wheel 50 causes a corresponding rotation of the pedals 56. Alternatively, the pedals 56 may be operatively coupled to the front wheel 50 through a free-wheel arrangement. In such an arrangement, the rotation of the front wheel 50 may not cause a corresponding rotation of the pedals 56. Such arrangements are known in the art and a further description of a free-wheel arrangement will not be provided.

The second frame 44 includes a head tube (not shown) configured to rotatably receive the steering tube of the first frame 42, a seat 58 for supporting the rider, and a pair of rear wheels 60. As noted above, the tricycle 40 is configured as a motor-powered vehicle. Accordingly, the second frame 44 further includes a motor 62 for providing a motive force for moving the tricycle 40 in a direction dictated by the first frame 42, and the steering assembly 52 in particular. In an exemplary embodiment, the motor 62 may be an electric motor, but the invention is not so limited, as other types of motors may also be used. As electric motors, and other possible motors, are well understood in the art and commercially available, the details of the motor 62 will not be further described herein. It is understood that the motor 62 is operatively coupled to one or more of the rear wheels 60 for driving the tricycle 40. Although not shown, the motor 62 may be coupled to a battery, such as a rechargeable battery, for providing power to the motor 62.

In use, when the battery is charged and operational, a rider may selectively engage a switch 64 on steering assembly 52 for providing power to the motor 62 and causing the driven wheel 60 to turn and propel the tricycle 40. This motor driven state represents a first operational mode of the tricycle 40. The switch 64 may take a wide variety of forms, including a lever, a button, a rotating grip, or other types of switches known in the art. The tricycle 40 may be operated in this first mode until the battery is substantially depleted of power, at which point there is insufficient power to operate the motor 62 and turn the driven wheel 60.

In accordance with an aspect of the invention, the tricycle 40, and more particularly the driven wheel 60, is configured to be disengaged from the motor 62 such that the tricycle 40 may be operated in a traditional sense without being subjected to significant motor drag or resistance. In the instant embodiment, the tricycle 40 is configured to be self-propelled by pedal power in a second operational mode of the tricycle 40 without being subjected to significant motor drag or resistance. In this regard, the tricycle 40 includes a motor drive selector mechanism that allows the tricycle to be selectively operated in the first operational mode (motor powered) or the second operational mode (pedaled powered). The motor drive selector mechanism will now be described in further detail.

Figure 3:
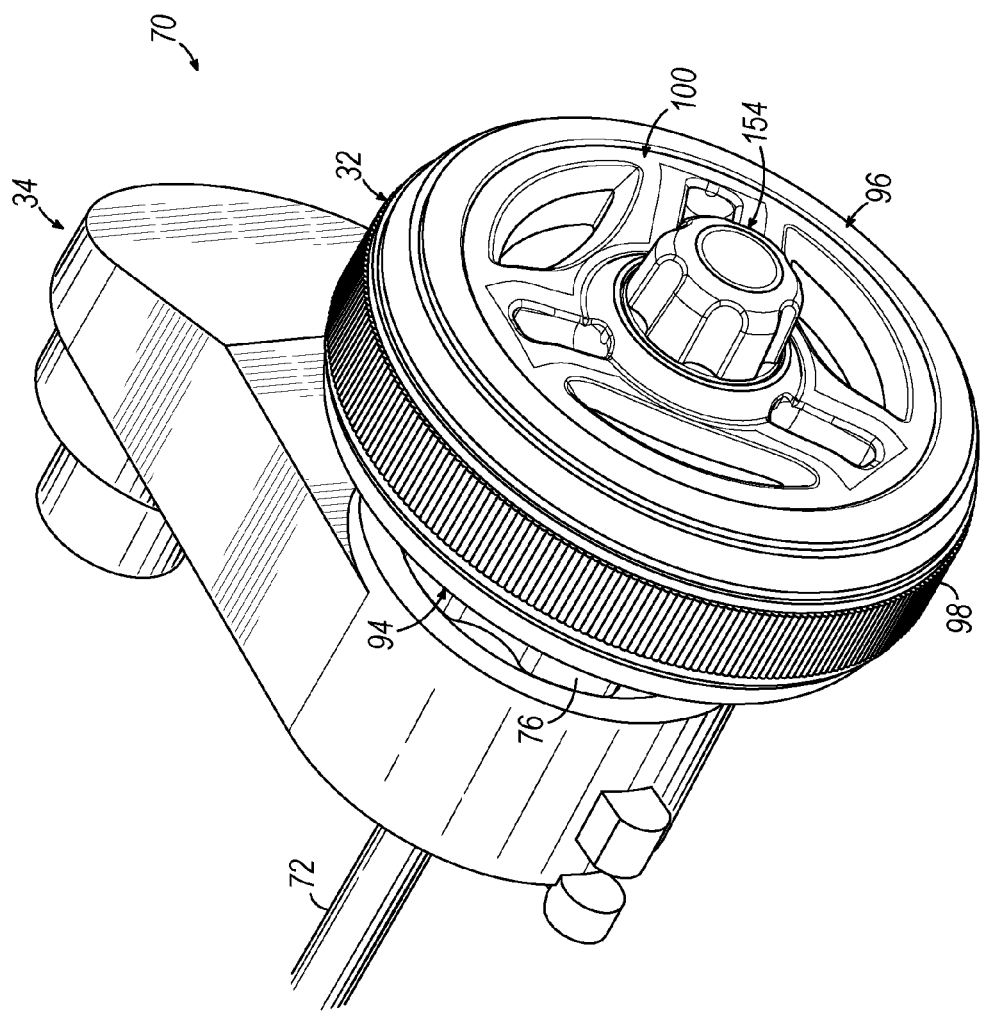
FIG. 3 is a perspective view of a motor/wheel assembly in accordance with the invention.
Figure 4:
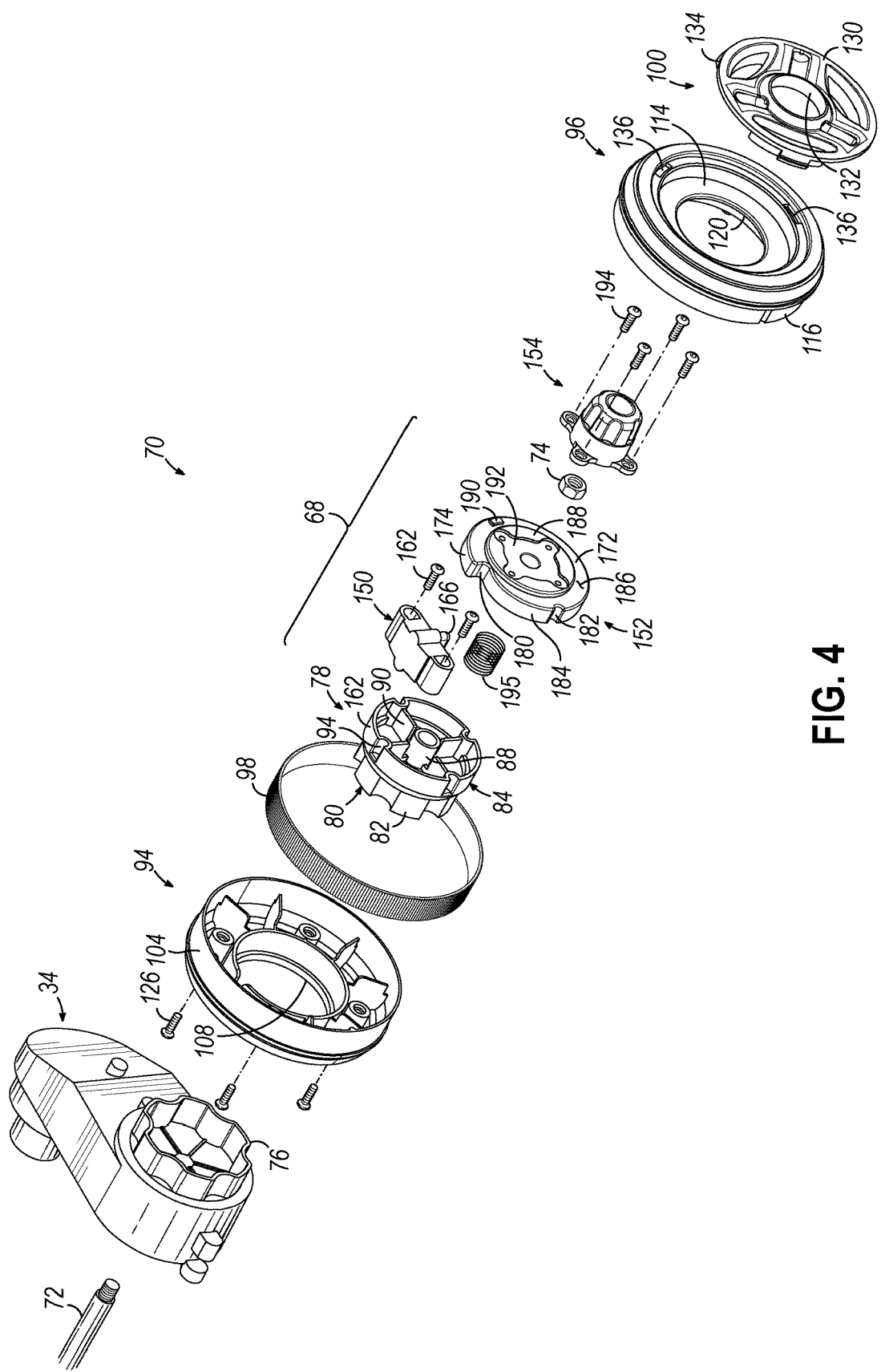
FIG. 4 is a disassembled perspective view of the motor/wheel assembly of FIG. 3.

The motor drive selector mechanism 68 for both the scooter 10 and the tricycle 40 may be substantially the same. Accordingly, the details of the selector mechanism 68 will be further described in regard to the scooter 10. It should be recognized, however, that the details of the motor drive selector mechanism may also apply to the tricycle 40. FIG. 3 illustrates a motor/wheel assembly 70 for the scooter 10 and FIG. 4 illustrates a disassembled view of the motor/wheel assembly 70. The motor/wheel assembly 70 is supported relative to the second frame 14 via a rear axle 72 wherein the assembly is kept together via an axle nut 74. The motor 34 includes a starred drive wheel 76 having undulations along its circumference and being driven by the motor 34 such that when the motor is activated, the drive wheel 76 rotates in a preferred direction (e.g., clockwise direction when viewed outboard of the motor 34).

The motor drive selector mechanism 68 includes a drive adaptor 78 configured to be coupled to the drive wheel 76 of the motor 34 and further configured to be selectively coupled to the rear wheel 32 of the scooter 10 in a manner more fully disclosed below. The drive adaptor 78 includes a first portion 80 (e.g., rear portion toward motor 34) having an outer wall 82, a central tubular post (not shown) configured to receive axle 72, and support walls (not shown) extending between the central post and outer wall 82. The first portion 80 has a profile generally corresponding to the profile of drive wheel 76. More particularly, the outer wall 82 includes undulations along its circumference arranged such that the first portion 80 may be slidingly engaged with the drive wheel 76 (e.g., inside of drive wheel 76). The undulations in the drive wheel 76 and first portion 80 of the drive adaptor 78 are configured to transmit the torque of drive wheel 76 to the drive adaptor 78 through an interference relationship between the undulations.

The drive adaptor 78 further includes a second portion 84 (e.g., front portion away from motor 34) having an outer peripheral wall 86, a central tubular post 88 configured to receive axle 72, and generally radial support walls 90 extending between the central post 88 and outer wall 86 for increasing the strength of the drive adaptor 78. The outer wall 86 includes a plurality of recesses 92 formed therein, the purpose of which will be described more fully below. As discussed in more detail below, the second portion 84 of the drive adaptor 78 is configured to extend within the interior of the wheel 32 (see, e.g., FIGS. 6, 7 and 8).

Figure 5:
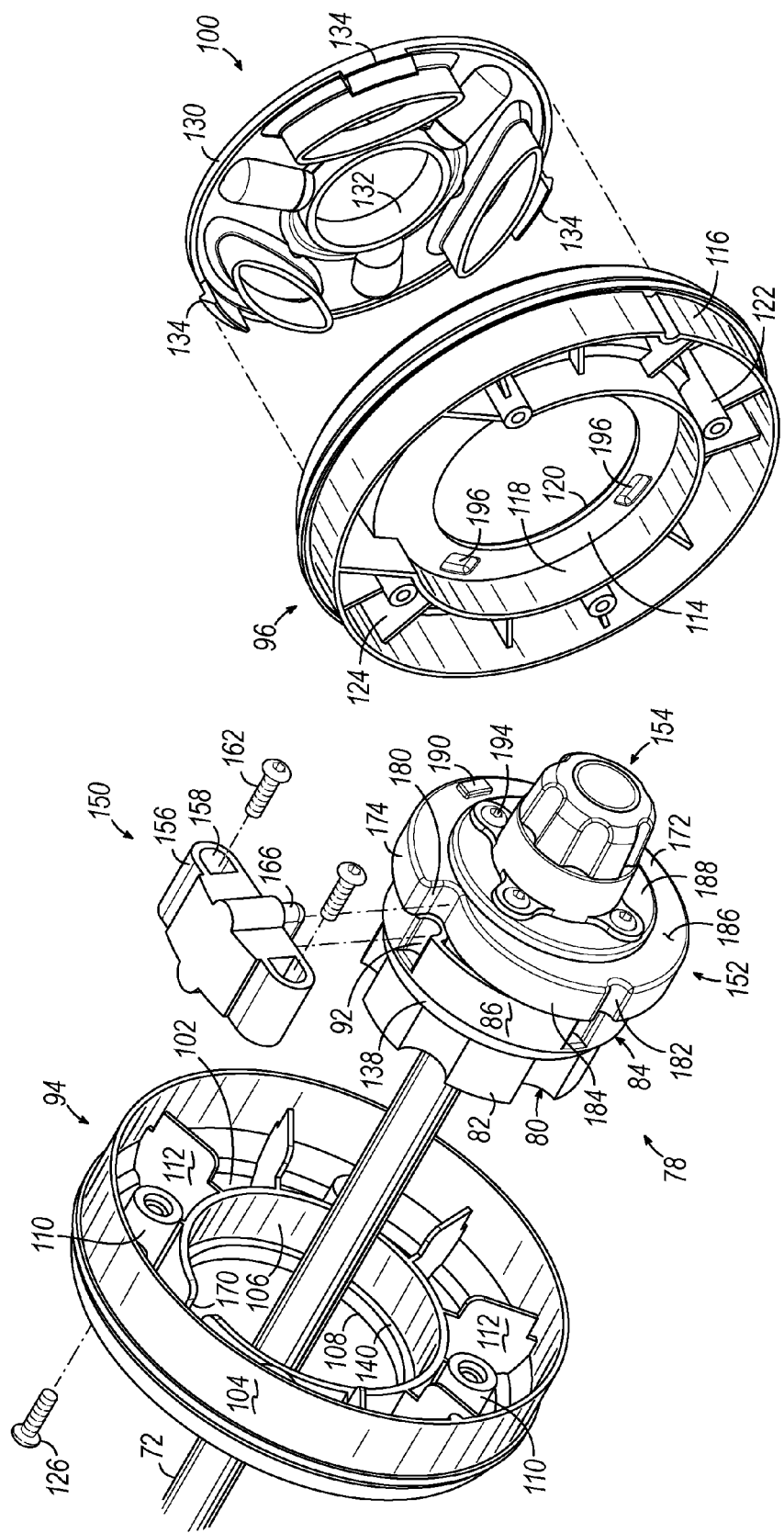
FIG. 5 is a disassembled perspective view of a wheel in accordance with an embodiment of the invention.

In an exemplary embodiment, and as best illustrated in FIG. 5, the wheel 32 has a multi-part construction primarily including a first (e.g., rear) wheel half 94, a second (e.g., front) wheel half 96, a tread 98, and a hub cap 100. The first wheel half 94 includes a side wall 102, an outer circumferential wall 104, an inner circumferential wall 106 defining an opening 108 through side wall 102, and a plurality of posts 110 and support walls 112 on a front surface of side wall 102. In a similar manner, the second wheel half 96 includes a side wall 114, an outer circumferential wall 116, an inner circumferential wall 118 defining an opening 120 through side wall 114, and a plurality of posts 122 and support walls 124 on a rear surface of side wall 114. The first and second wheel halves 94, 96 are configured to be mated together, in for example an overlapping arrangement, to form the wheel 32. In this regard, certain of the posts 110, 122 may be aligned and a fastener 126 used to couple the two wheel halves 94, 96 together to thereby form the outer shell of the wheel 32. When so coupled, the wheel 32 defines a central groove 128 in the outer circumferential walls 104, 116 configured to receive the tread 98 therein. The tread 98 may be formed from a generally resilient material, such as rubber or the like, and enhance traction with the surface on which the scooter 10 is moving.

The hub cap 100 may be configured as a generally plate-like member 130 having a central opening 132, for purposes to be described below. Not unlike automobile hub caps, the hub cap 100 is configured to have a decorative aspect thereto and further configured to cover certain components of the wheel 32. The hub cap 100 is configured to be coupled to the front side of side wall 114 of wheel 32. In this regard, the hub cap 100 may include one or more L or J-shaped spring clips 134 (e.g., three spring clips) and the wheel 32, and more particularly the second wheel half 96, may include a corresponding number of recesses 136 (FIG. 4) configured to receive the spring clips 134 therein for securing the hub cap 100 to the wheel 32.

Figure 6:
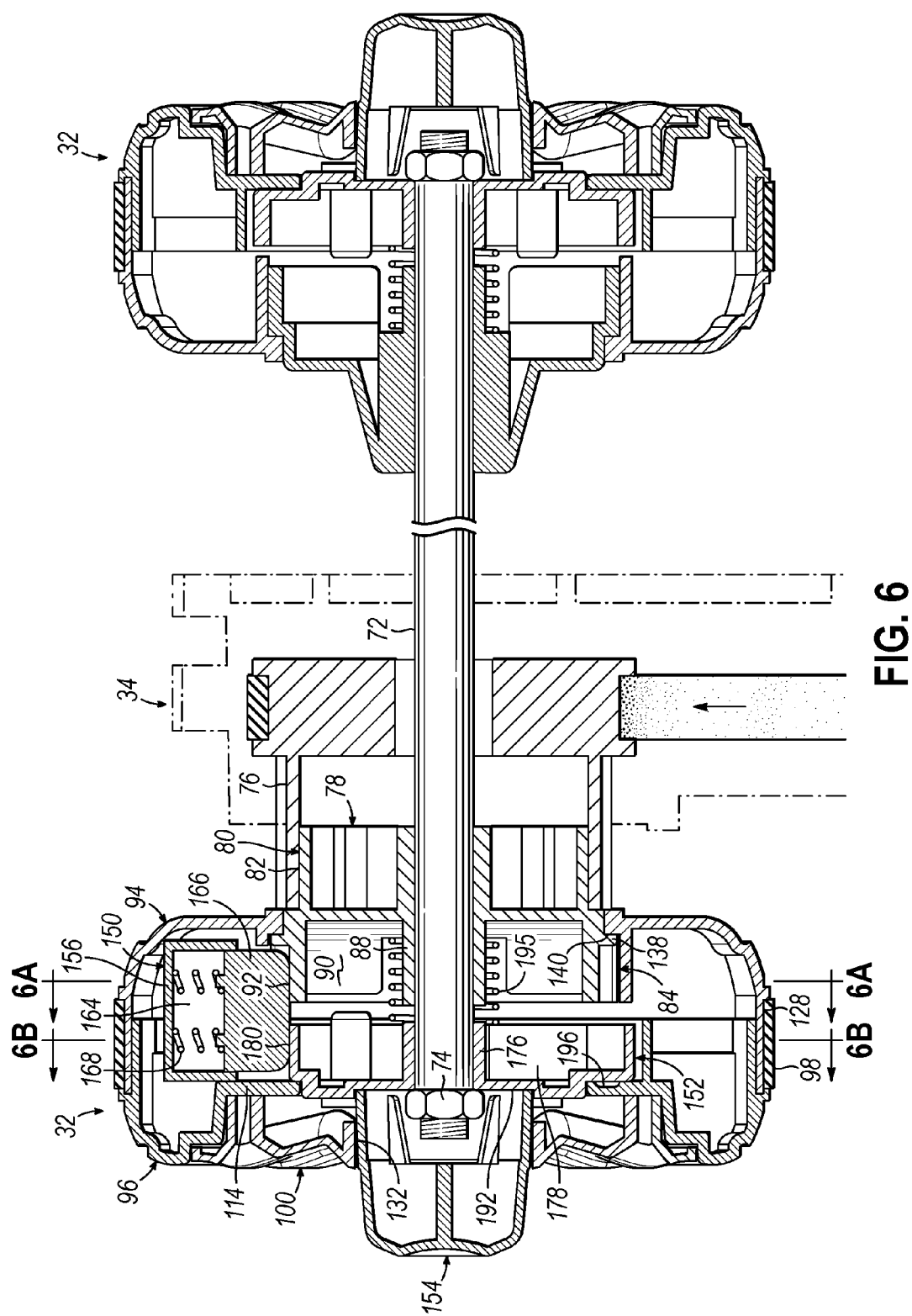
FIG. 6 is a cross-sectional view of the scooter shown in FIG. 1 taken generally along line 6-6 when in a first operational mode.
Figure 7:
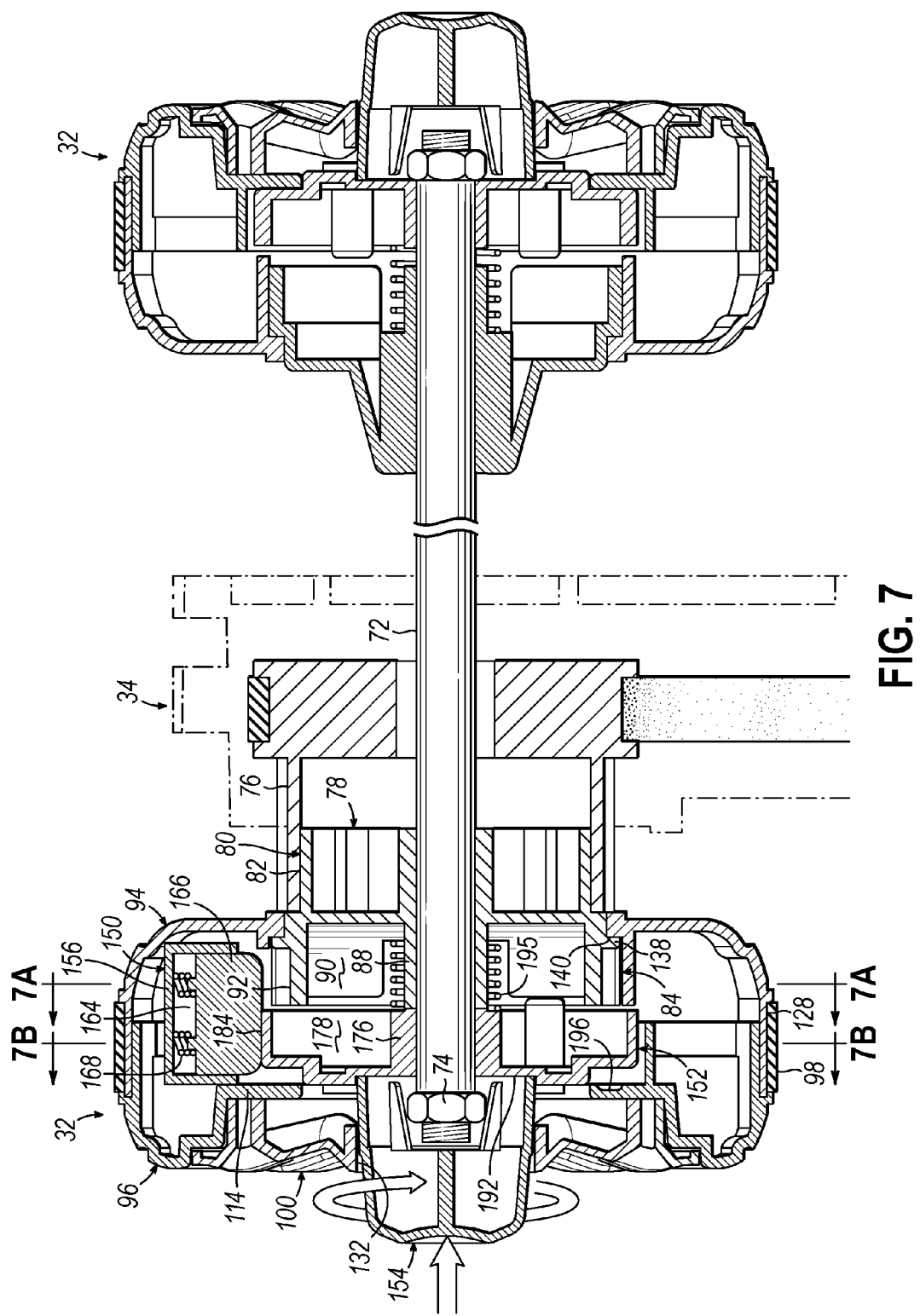
FIG. 7 is a cross-sectional view similar to FIG. 6 intermediate a first and second operational mode.
Figure 8:
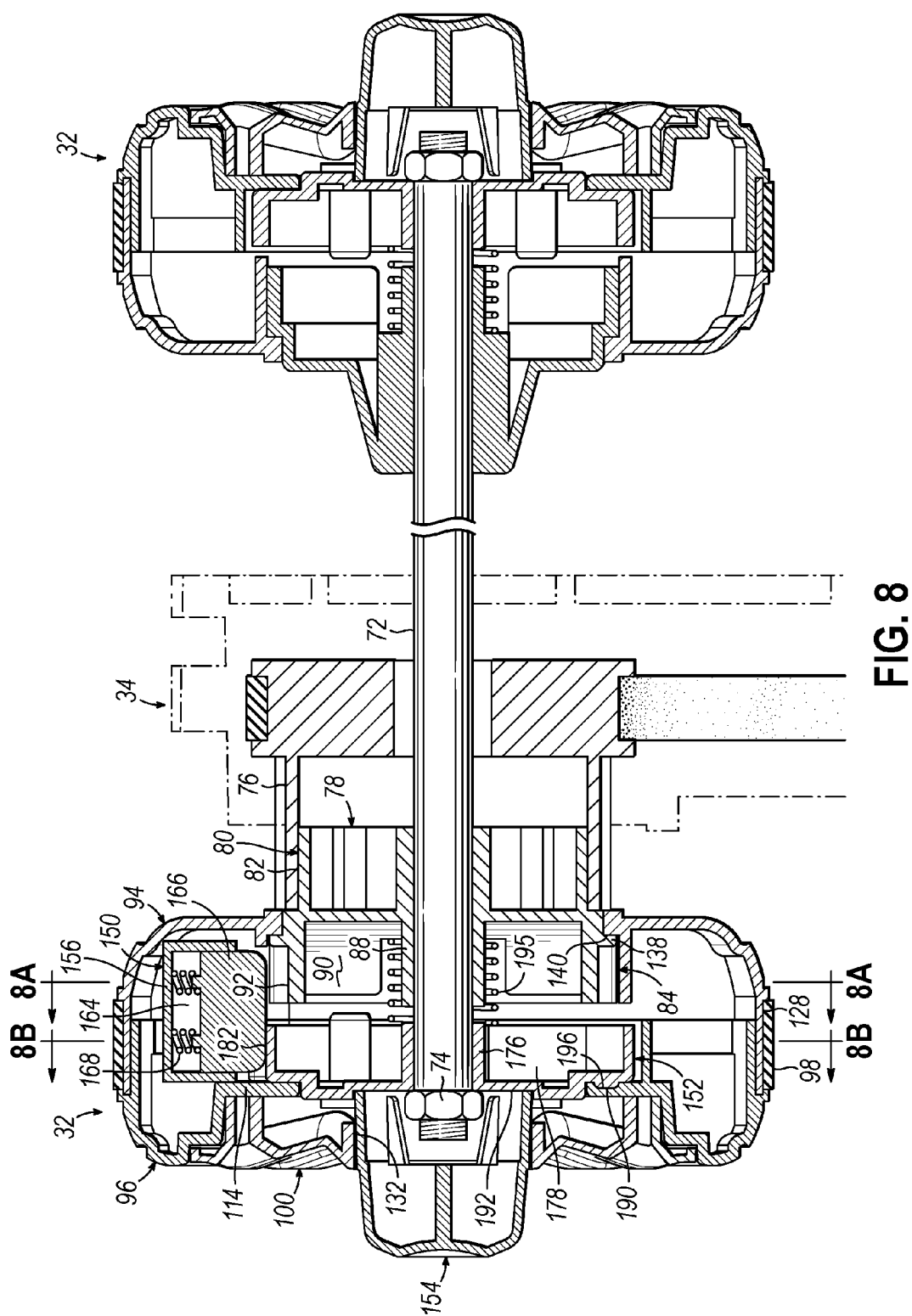
FIG. 8 is a cross-sectional view similar to FIG. 6 when in a second operational mode.

As noted in the cross-sectional view of FIGS. 6, 7 and 8, when the wheel 32 is secured to the scooter 10, such as by tightening axle nut 74 onto axle 72, the second portion 84 of the drive adaptor 78 is generally positioned within the wheel 32 and at least a portion of the first portion 80 extends from the wheel 32 and is received within the drive wheel 76. More particularly, the second portion 84 of the drive adaptor 78 includes an annular ring 138 which engages against a shoulder 140 adjacent the opening 108 in the side wall 102 and a bearing surface 142 of the drive adaptor 78 may engage with a portion of the first wheel half 94 that defines opening 108. Additionally, the inner circumferential wall 106 of the first wheel half 94 generally confronts and surrounds the outer wall 86 of drive adaptor 78 in engaging or nearly engaging relationship.

In accordance with an aspect of the invention, the motor drive selector mechanism 68 may be generally positioned within the interior of the wheel 32. As noted above, the selector mechanism 68 is configured to selectively operate the scooter 10 in a first operational mode where the rear wheel 32 is driven by the motor 34 and a second operational mode where the scooter 10 may be self-propelled without the rear wheel 32 experiencing significant drag or resistance from the motor 34. To this end, the motor drive selector mechanism 68 further includes a lock pin assembly 150, a selector plate 152, and a control knob 154 for moving the selector plate 152 in a desired position. Each of these will now be described in detail.

The lock pin assembly 150 includes a generally oblong lock pin housing 156 configured to be fixedly coupled to the wheel 32. More particularly, in an exemplary embodiment the housing 156 includes two passages 158 therethrough configured to receive posts 160 extending from the inner surface of the first wheel half 94. Fasteners 162 may be used to secure the housing 156 to the posts 160 and thus to the wheel 32. Accordingly, the lock pin housing 156 rotates with rotation of the wheel 32. Between the two passages 158 in housing 156 is an elongate recess 164 configured to receive an elongate lock pin 166. The elongate lock pin 166 is movable relative to the housing 156 between a first extended position and a second retracted position. The movement of the lock pin 166 may be generally in a radial direction. In the extended position, the lock pin 166 extends out of the lock pin housing 156. In the retracted position, the lock pin 166 has been moved toward the inside of the housing 156 such that essentially no portion of the lock pin 166, or only a relatively small portion of the lock pin 166, extends from the housing 156. In any event, the amount of the lock pin 166 that extends from the housing 156 is greater in the first position than in the second position.

In an exemplary embodiment, the lock pin 166 may be biased toward the first extended position. In this regard, the lock pin assembly 150 may include one or more springs 168 or other resilient members that bias the lock pin 166 toward the first position. In an exemplary embodiment, for example, two springs 168 may be positioned in the recess 164 for biasing the lock pin 166 toward the first position. When the lock pin housing 156 is coupled to the front surface of the first wheel half 94, the lock pin 166 is configured to extend through a slot or gap 170 in the inner circumferential wall 106 at least when in the first position of the lock pin 166 (FIG. 5). The purpose of the spring bias as well as the slot 170 in the circumferential wall 106 will be explained in more detail below.

Turning now to the selector plate 152, the selector plate 152 includes a generally cylindrical body having a side wall 172, an outer circumferential wall 174, a central tubular post 176 defining an opening configured to receive axle 72, and generally radial support walls 178 extending between the central post 176 and outer wall 174 for increasing the strength of the selector plate 152. The outer wall 174 includes a first recess 180, a second recess 182 circumferentially spaced from the first recess 180, and a cam surface 184 extending between the first and second recesses 180, 182. The first recess 180 has a depth (e.g., in the radial direction) greater than a depth of the second recess 182 (in the radial direction), and the cam surface 184 extends from adjacent a trough of the first recess 180 to adjacent the second recess 182 such that the radial extent of the cam surface 184 increases in a circumferential direction from the first recess 180 toward the second recess 182. The purpose of the cam surface 184 will be explained in more detail below. Furthermore, a front surface 186 of the side wall 172 includes a raised ring 188 and a projection 190. The purpose of these will also be explained in detail below. Within the raised ring 188 is a star-shaped groove 192 configured to receive the lower end portion of the control knob 154. Fasteners 194 may be used to secure the control knob 154 to the selector plate 152.

As illustrated in the cross-sectional views of FIGS. 6, 7 and 8, when the wheel 32 is assembled, the selector plate 152 is positioned adjacent, but spaced from, the drive adaptor 78. The selector plate 152 is configured to be movable relative to the drive adaptor 78 and the wheel 32. More particularly, the selector plate 152 is rotatable relative to the drive adaptor 78 and the wheel 32 between a first motor-engaged position and a second motor-disengaged position. The rotational movement of the selector plate 152 between the first and second positions is achieved manually using the control knob 154, which projects through the central opening 132 in the hub cap 100 and is thereby accessible to the user.

In addition to the selector plate 152 being rotationally movable relative to the drive adaptor 78 and the wheel 32, the selector plate is also axially movable relative thereto between a first position and a second position. In the first axial position, the selector plate 152 is configured to engage with the wheel 32, and more particularly the second wheel half 96, to lock the selector plate 152 from rotational movements relative to the second wheel half 96. In the second axial position, the selector plate 152 is released from engagement with the second wheel half 96 such that the selector plate 152 is permitted to rotate relative to the wheel 32. In the first axial position of the selector plate 152, the selector plate 152 may be axially spaced from the drive adaptor 78 by an amount greater than when the selector plate 152 is in the second axial position.

In an exemplary embodiment, the selector plate 152 may be biased in an outward direction away from the drive adaptor 78. Accordingly, the selector plate 152 may be biased toward the first axial position. In this regard, one end of a spring 195 may extend around the tubular post 88 and engage an abutment on the front side of the adaptor 78. By way of example, the abutment on the drive adaptor 78 may be provided by the radial support walls 90. The other end of the spring 195 may engage an abutment on the rear side of the selector plate 152, such as an abutment provided by the radial support walls 178.

The operation of the motor drive selector mechanism 68 and the interaction between the various components will now be described in reference to FIGS. 6-8B. In FIGS. 6-6B, the selector plate 152 is illustrated in the first motor-engaged position rotationally and in its first position axially. As shown in FIG. 6, a recess 92 in the drive adaptor 78 is axially aligned with the first recess 180 in the selector plate 152 and both of these recesses 92, 180 are radially aligned with the lock pin 166 of the lock pin assembly 150. Due to the bias of the springs 168, the lock pin 166 extends through the slot 170 in the inner circumferential wall 106 and within both the recess 92 in the drive adaptor 78 and the first recess 180 in the selector plate 152 (FIGS. 6A and 6B). As a result, the torque that is applied to the drive adaptor 78 from the motor 34 is transferred to the wheel 32 through the lock pin assembly 150. Accordingly, the wheel 32 may be driven by the motor 34. The selector plate 152 is rotationally locked in the first motor-driven position through an engagement between projection 190 on the front surface 186 of the selector plate 152 and a recess 196 on the rear side of the side wall 114 of the second wheel half 96 (FIG. 5). The bias provided by the spring 195 maintains the engagement of the projection 190 and recess 196, and thus prevents the rotation of the selector plate 152 relative to the wheel 32, until a sufficient force is provided to overcome the spring force.

Figure 7B:
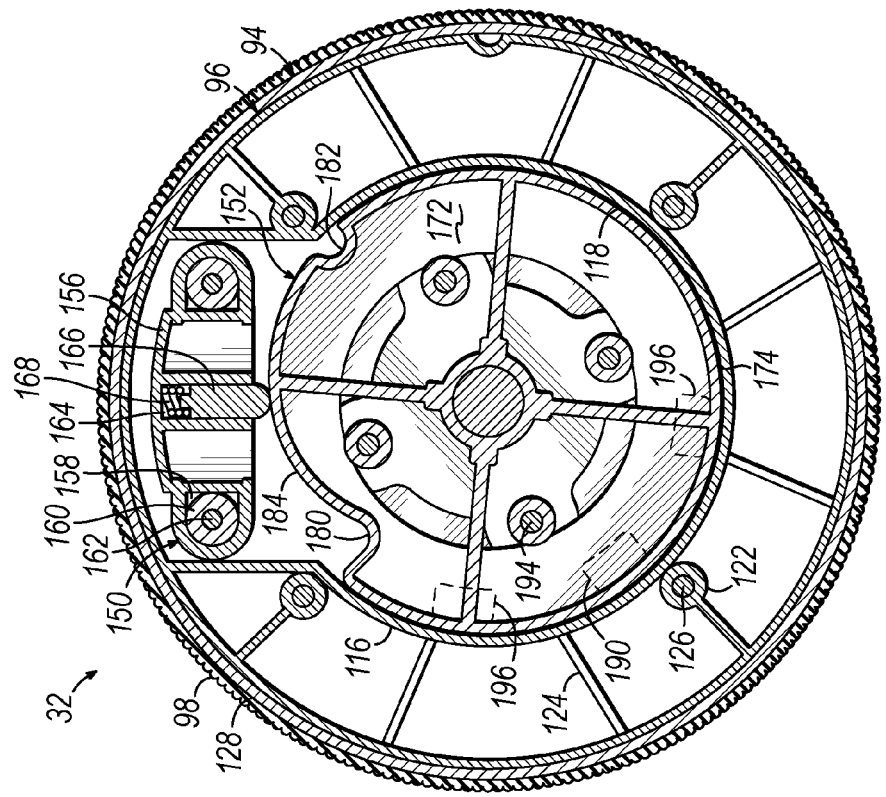
FIG. 7B is a cross-sectional view of the wheel of FIG. 7 taken generally along line 7B-7B.
Figure 7A:
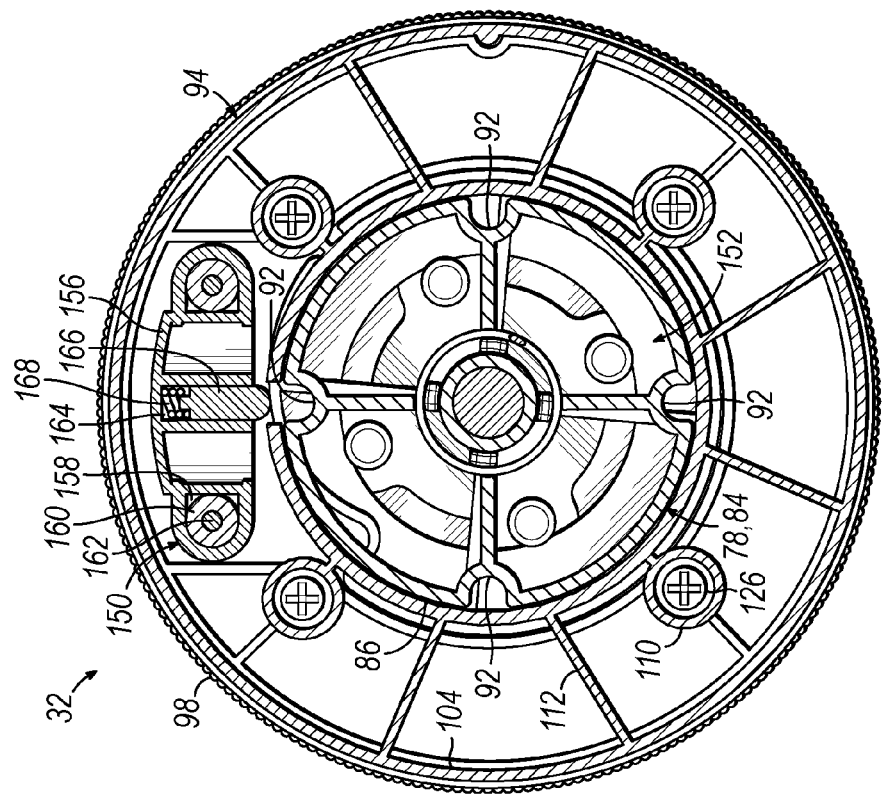
FIG. 7A is a cross-sectional view of the wheel of FIG. 7 taken generally along line 7A-7A.

When it is desired to move the scooter 10 from its first operational mode to its second operational mode, such as when the power from the battery is depleted and the motor 34 can no longer drive the scooter 10, the motor drive selector mechanism 68 may be moved so that the scooter 10 may operate in a traditional sense and without significant drag or resistance from the motor 34. As illustrated in FIGS. 7-7B, the selector plate 152 may be moved to its second motor-disengaged position. To this end, the control knob 154 may be grasped by a user and pushed axially inward so as to overcome the force provided by spring 195. When the selector plate 152 has been moved to its second axial position, the projection 190 on the selector plate 152 no longer resides within the recess 196 in the second wheel half 96 of wheel 32 and the selector plate 152 may be rotated. As the selector plate 152 is rotated within the wheel 32 toward the second recess 182, the lock pin 166 engages against cam surface 184. Due to the shape (i.e., the radial aspects) of the cam surface 184, as the selector plate 152 is rotated, the lock pin 166 moves from its extended position (FIG. 6A) towards its retracted position. Accordingly, as the selector plate 152 is rotated, the lock pin 166 moves away from recess 92 in the drive adaptor 78.

As further illustrated in FIGS. 8-8B, as the selector plate 152 is further rotated and the lock pin 166 moves along cam surface 184, the lock pin 166 encounters the second recess 182 and snaps into the second recess 182 under the bias from springs 168. When the lock pin 166 is in the second recess 182, the lock pin 166 is in its retracted position such that the lock pin 166 no longer resides in the recess 92 in the drive adaptor 78. Accordingly, the wheel 32 is free to rotate independent of the drive adaptor 78 and consequently free to rotate independent of the motor 34. In this way, the scooter 10 may be used in a traditional sense, i.e., moved by the use of foot power and the wheel 32 may rotate without significant motor drag or resistance.

After the selector plate 152 has been sufficiently rotated such that the lock pin 166 resides in second recess 182, the selector plate 152 may be rotationally locked in the second motor-disengaged position. This is achieved through release of the control knob 154 such that the selector plate 152 moves axially outward under the bias from spring 195. As the selector plate 152 moves axially back toward its first position, the projection 190 on the front surface 186 of the selector plate 152 engages another recess 196 on the rear side of the side wall 114 of the second wheel half 96 (FIG. 5). The bias provided by the spring 195 maintains the engagement of the projection 190 and recess 196, and thus prevents the rotation of the selector plate 152 relative to the wheel 32, until a sufficient force is provided to overcome the spring force.

Of course, when it is desired to change the mode of operation from the second operational mode to the first operational mode, the user may grasp the control knob 154, move it axially inward to release the lock provided by projection 190 and recess 196, rotate the selector plate 152 in the opposite direction such that the lock pin 166 moves toward its extended position by moving along cam surface 184 until the lock pin 166 snaps into engagement with a recess 92 in the drive adaptor 78 such that the motor 34 and the wheel 32 are operatively coupled and the motor 34 drives the scooter 10. The wheel 32 may have to be rotated to align a recess 92 with the lock pin 166.

Figure 9:
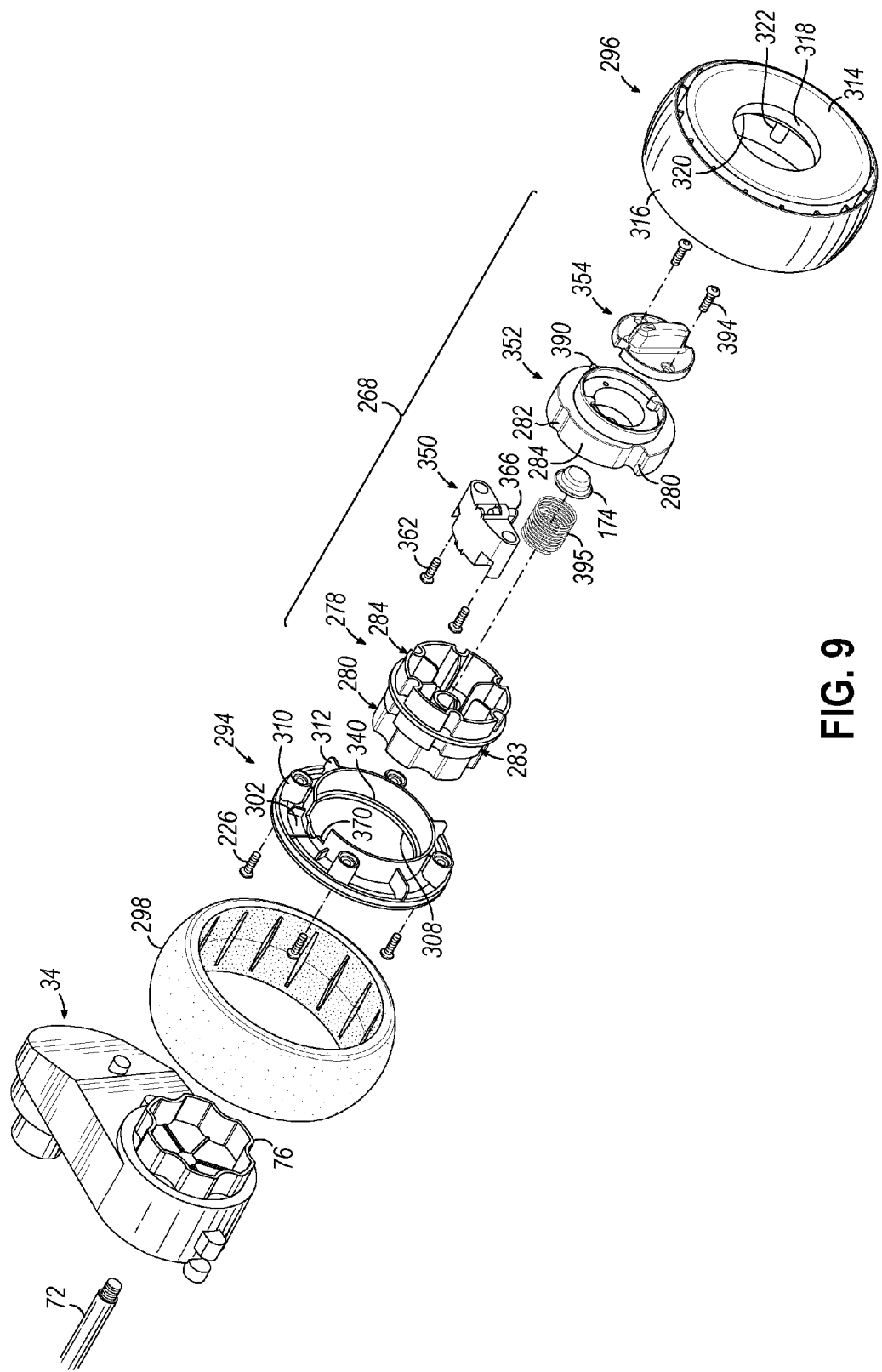
FIG. 9 is a disassembled perspective view of an alternative motor/wheel assembly in accordance with the invention.
Figure 10:
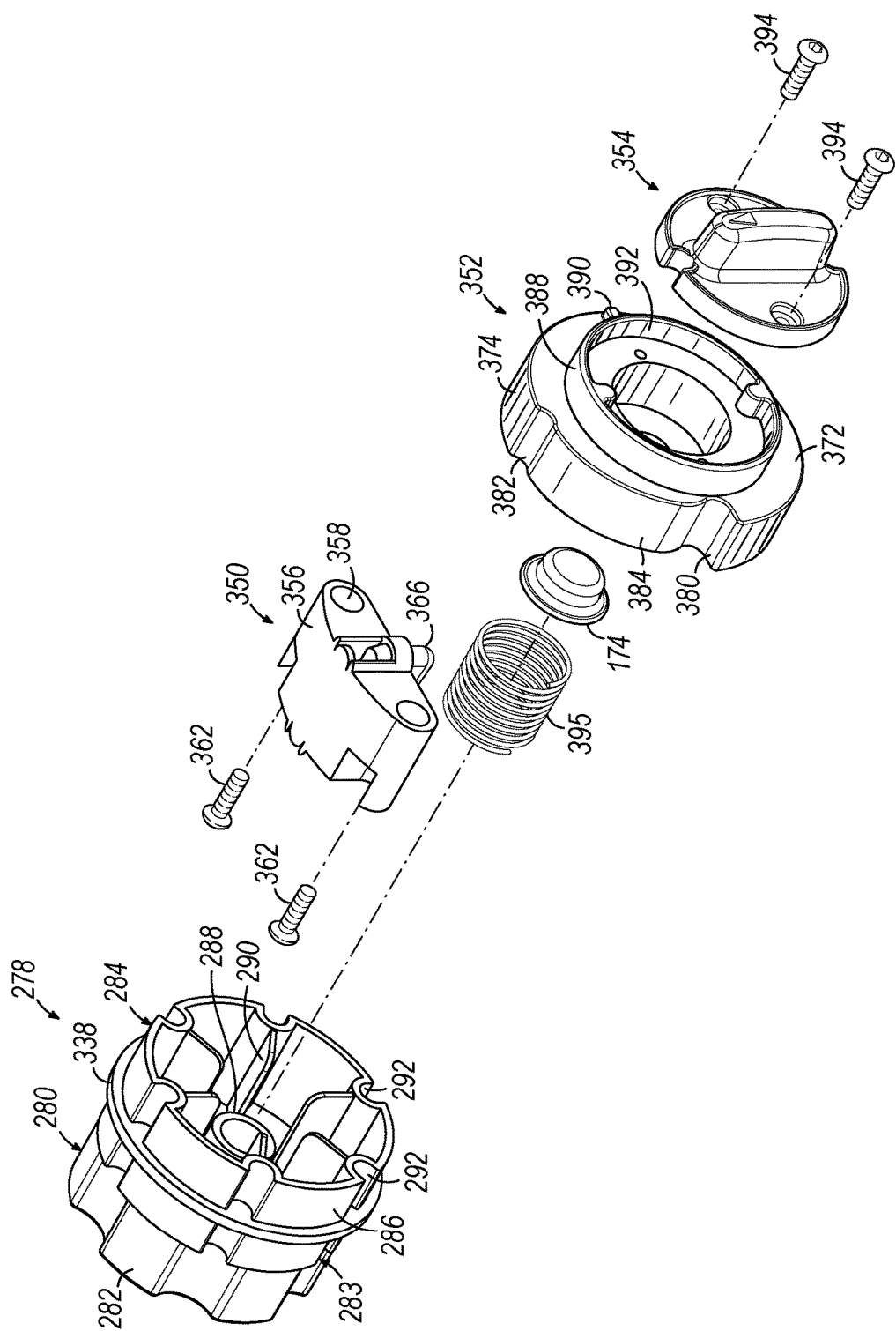
FIG. 10 is a close-up disassembled perspective view of the motor drive selector mechanism shown in FIG. 9.

Referring now to FIGS. 9 and 10, in an alternative embodiment, a motor drive selector mechanism 268 includes a drive adaptor 278 configured to be coupled to the drive wheel 76 of a motor 34 and further configured to be selectively coupled to the rear wheel of a vehicle such as, for example, a scooter in a manner similar to that previously described. The drive adaptor 278 includes a first portion 280 (e.g., rear portion toward motor 34) having an outer wall 282, a central tubular post (not shown) configured to receive an axle 72 of the vehicle, and support walls (not shown) extending between the central post and outer wall 282. The first portion 280 has a profile generally corresponding to the profile of the drive wheel 76. More particularly, the outer wall 282 includes undulations along its circumference arranged such that the first portion 280 may be slidingly engaged with the drive wheel 76 (e.g., inside of drive wheel 76). The undulations in the drive wheel 76 and first portion 280 of the drive adaptor 278 are configured to transmit the torque of the drive wheel 76 to the drive adaptor 278 through an interference relationship between the undulations.

The drive adaptor 278 further includes a second portion 284 (e.g., front portion away from motor 34) having an outer peripheral wall 286, a central tubular post 288 configured to receive the axle 72, and generally radial support walls 290 extending between the central post 288 and outer wall 286 for increasing the strength of the drive adaptor 278. The outer wall 286 includes a plurality of recesses 292 formed therein, the purpose of which is substantially similar to that previously described with respect to recesses 92. As discussed in more detail below, the second portion 284 of the drive adaptor 278 is configured to extend within the interior of the wheel. As shown, the drive adaptor 278 may further include an intermediate portion 283 extending between the first and second portions 280, 284. The intermediate portion 283 may provide additional length to the drive adaptor 278 such that the first portion 280 may engage with the drive wheel 76 while the second portion 284 extends within the interior of the wheel.

In an exemplary embodiment, the wheel has a multi-part construction primarily including a first (e.g., rear) wheel half 294, a second (e.g., front) wheel half 296, and a tread 298. The first wheel half 294 includes a side wall 302, an inner circumferential wall 306 defining an opening 308 through the side wall 302, and a plurality of posts 310 and support walls 312 on a front surface of the side wall 302. The second wheel half 296 includes a side wall 314, an outer circumferential wall 316, an inner circumferential wall 318 defining an opening 320 through the side wall 314, and a plurality of posts 322 and support walls (not shown) on a rear surface of the side wall 314. The first and second wheel halves 294, 296 are configured to be mated together, in for example an overlapping arrangement, to form the wheel. In this regard, certain of the posts 310, 322 may be aligned and fasteners 226 used to couple the two wheel halves 294, 296 together to thereby form the outer shell of the wheel. When the wheel halves 294, 296 are so coupled, the tread 298 may be received thereover. The tread 298 may be formed from a generally resilient material, such as rubber or the like, and enhance traction with the surface on which the vehicle is moving.

When the wheel is secured to the scooter 10, such as by tightening an axle nut 74 onto the axle 72, the second portion 284 of the drive adaptor 278 is generally positioned within the wheel and at least a portion of the first portion 280 extends from the wheel and is received within the drive wheel 76. More particularly, the second portion 284 of the drive adaptor 278 includes an annular ring 338 which engages against a shoulder 340 adjacent the opening 308 in the side wall 302 and a bearing surface of the drive adaptor 278 may engage with a portion of the first wheel half 294 that defines the opening 308. Additionally, the inner circumferential wall 306 of the first wheel half 294 generally confronts and surrounds the outer wall 286 of the drive adaptor 278 in an engaging or nearly engaging relationship.

As in the previous embodiment, the motor drive selector mechanism 268 further includes a lock pin assembly 350, a selector plate 352, and a control knob in the form of a dial 354 for moving the selector plate 352 in a desired position. Each of these will now be described in detail.

The lock pin assembly 350 includes a generally oblong lock pin housing 356 configured to be fixedly coupled to the wheel. More particularly, in an exemplary embodiment the housing 356 includes two passages 358 therethrough configured to receive posts (not shown) extending from the inner surface of the second wheel half 296. Fasteners 362 may be used to secure the housing 356 to the posts and thus to the wheel. Accordingly, the lock pin housing 356 rotates with rotation of the wheel. Between the two passages 358 in the housing 356 is an elongate recess (not shown) configured to receive an elongate lock pin 366. The elongate lock pin 366 is movable relative to the housing 356 between a first extended position and a second retracted position. The movement of the lock pin 366 may be generally in a radial direction. In the extended position, the lock pin 366 extends out of the lock pin housing 356. In the retracted position, the lock pin 366 has been moved toward the inside of the housing 356 such that essentially no portion of the lock pin 366, or only a relatively small portion of the lock pin 366, extends from the housing 356. In any event, the amount of the lock pin 366 that extends from the housing 356 is greater in the first position than in the second position.

In an exemplary embodiment, the lock pin 366 may be biased toward the first extended position. In this regard, the lock pin assembly 350 may include one or more springs (not shown) or other resilient members that bias the lock pin 366 toward the first position. In an exemplary embodiment, for example, two springs may be positioned in the recess for biasing the lock pin 366 toward the first position. When the lock pin housing 356 is coupled to the rear surface of the second wheel half 296, the lock pin 366 is configured to extend through a slot or gap (not shown) in the inner circumferential wall 318 and/or a slot or gap 370 in the inner circumferential wall 306 at least when in the first position of the lock pin 366. The purpose of the spring bias as well as the slots 370 in the circumferential walls 306, 318 are substantially similar to those previously described with respect to the spring bias and slot 170 of the previous embodiment.

Turning now to the selector plate 352, the selector plate 352 includes a generally cylindrical body having a side wall 372, an outer circumferential wall 374, a central tubular post (not shown) defining an opening configured to receive the axle 72, and generally radial support walls (not shown) extending between the central post and the outer wall 374 for increasing the strength of the selector plate 352. The outer wall 374 includes a first recess 380, a second recess 382 circumferentially spaced from the first recess 380, and a cam surface 384 extending between the first and second recesses 380, 382. The first recess 380 has a depth (e.g., in the radial direction) greater than a depth of the second recess 382 (in the radial direction), and the cam surface 384 extends from adjacent a trough of the first recess 380 to adjacent the second recess 382 such that the radial extent of the cam surface 384 increases in a circumferential direction from the first recess 380 toward the second recess 382. The purpose of the cam surface 384 is substantially similar to that of the previously described cam surface 184. Furthermore, a front surface of the side wall 372 includes a cylindrical protrusion 388 and a projection 390 for engaging with recesses (not shown) on the rear side of the side wall 314 of the second wheel half 296. The cylindrical protrusion 388 includes an opening 392 sized and shaped to receive the dial 354. For example, the opening 392 may be generally circular with tabs extending radially inwardly so as to receive a dial 354 having a complementary circular shape with grooves extending radially inwardly. Fasteners 394 may be used to secure the dial 354 to the selector plate 352.

Similar to the previous embodiment, when the wheel is assembled, the selector plate 352 is positioned adjacent, but spaced from, the drive adaptor 278. The selector plate 352 is configured to be movable relative to the drive adaptor 278 and the wheel. More particularly, the selector plate 352 is rotatable relative to the drive adaptor 278 and the wheel between a first motor-engaged position and a second motor-disengaged position. The rotational movement of the selector plate 352 between the first and second positions is achieved manually using the dial 354, which projects through the opening 320 in the second wheel half 296 and is thereby accessible to the user.

In addition to the selector plate 352 being rotationally movable relative to the drive adaptor 278 and the wheel, the selector plate 352 is also axially movable relative thereto between a first position and a second position. In the first axial position, the selector plate 352 is configured to engage with the wheel, and more particularly the second wheel half 296, to lock the selector plate 352 from rotational movements relative to the second wheel half 296. In the second axial position, the selector plate 352 is released from engagement with the second wheel half 296 such that the selector plate 352 is permitted to rotate relative to the wheel. In the first axial position of the selector plate 352, the selector plate 352 may be axially spaced from the drive adaptor 278 by an amount greater than when the selector plate 352 is in the second axial position.

In an exemplary embodiment, the selector plate 352 may be biased in an outward direction away from the drive adaptor 278. Accordingly, the selector plate 352 may be biased toward the first axial position. In this regard, one end of a spring 395 may extend around the tubular post 288 and engage an abutment on the front side of the adaptor 278. By way of example, the abutment on the drive adaptor 278 may be provided by the radial support walls 290. The other end of the spring 395 may engage an abutment on the rear side of the selector plate 352, such as an abutment provided by the radial support walls (not shown).

The operation of the motor drive selector mechanism 268 and the interaction between the various components is substantially similar to that previously described with respect to FIGS. 6-8B, and thus will not be repeated for the sake of brevity.

Figure 11:
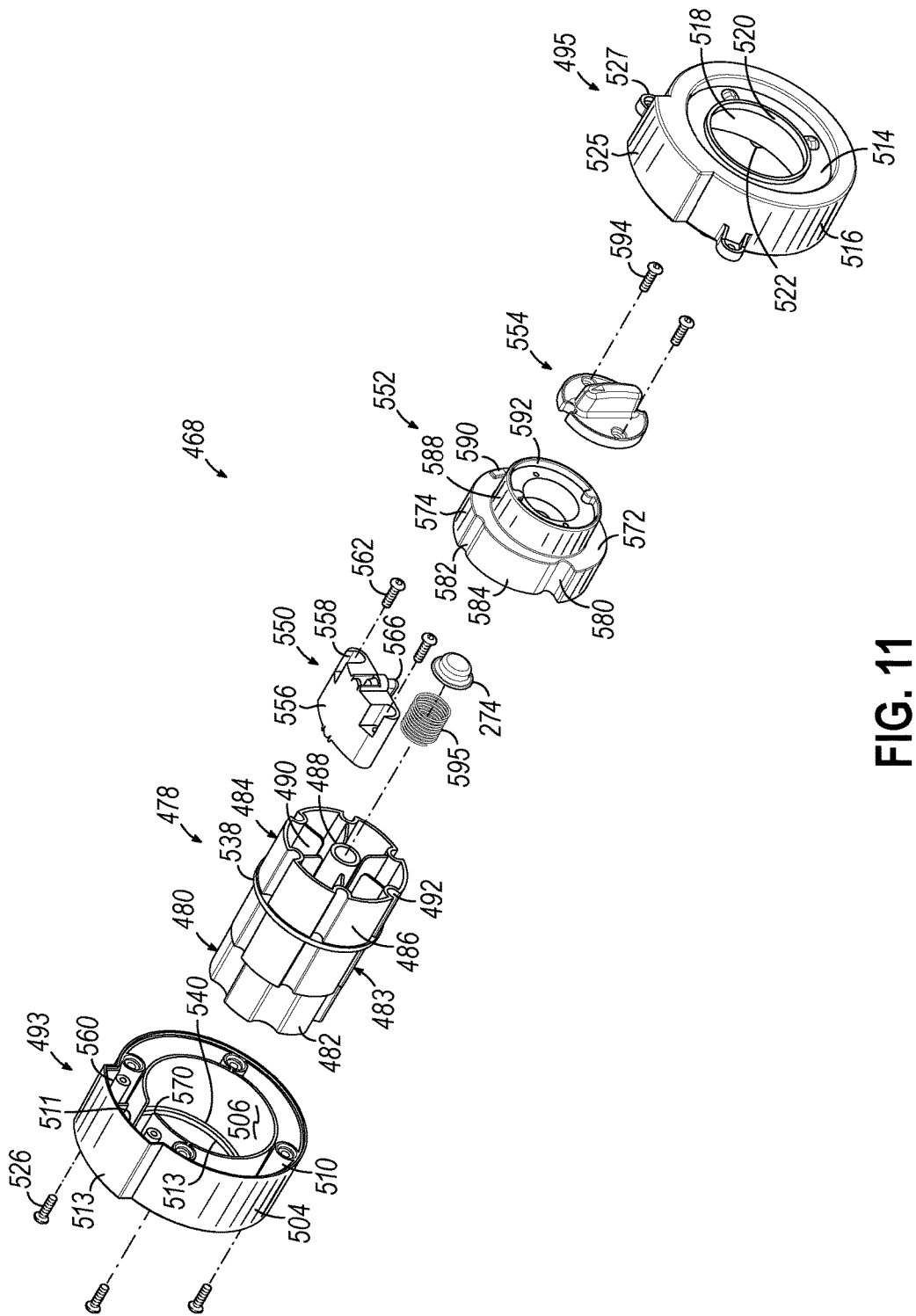
FIG. 11 is a disassembled perspective view of a canister housing a motor drive selector mechanism in accordance with the invention.
Figure 12:
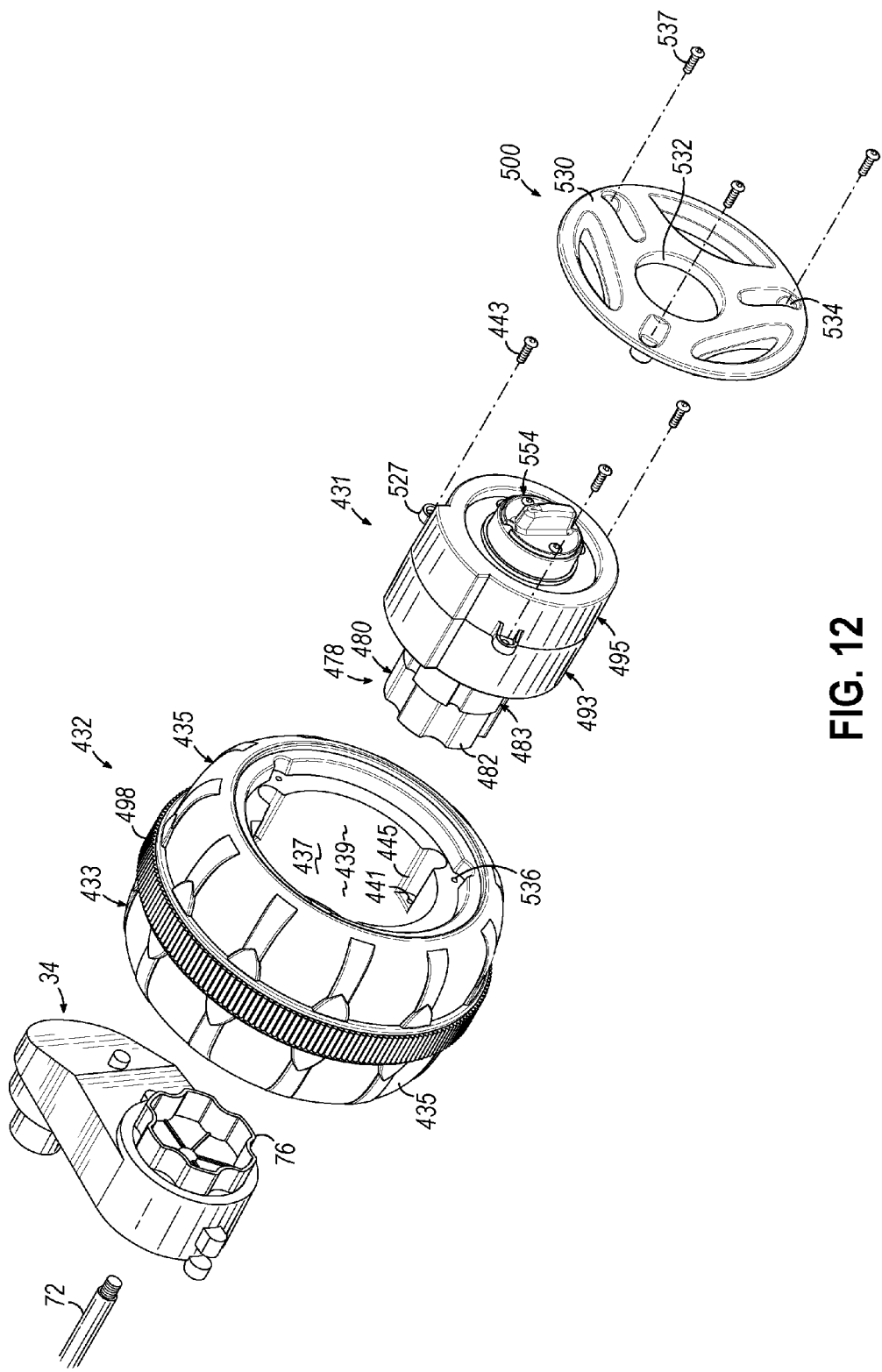
FIG. 12 is a disassembled perspective view of another alternative motor/wheel assembly in accordance with the invention and including the canister shown in FIG. 11.

Referring now to FIGS. 11 and 12, in an alternative embodiment, a motor drive selector mechanism is housed in a canister as a subassembly. The canister may be loaded into, and coupled to, a wheel of a vehicle such as, for example, a tricycle. As set forth in greater detail below, the motor drive selector mechanism housed in the canister allows the vehicle to which it is attached to be selectively operated in a first operational mode (motor powered) or a second operational mode (pedal powered), and operates in a manner similar to that previously described with respect to FIGS. 1-8B. However, it will be appreciated that by providing a canister which houses the motor drive selector mechanism and which may be loaded into a wheel and coupled thereto, the process of equipping a vehicle with the motor drive selector mechanism may require relatively minimal labor and provide certain manufacturing advantages.

With specific reference now to FIG. 11, a motor drive selector mechanism 468 includes a drive adaptor 478 configured to be coupled to a drive wheel 76 of a motor 34 and further configured to be selectively coupled to a rear wheel 432 of a vehicle in a manner more fully described below. The drive adaptor 478 includes a first portion 480 (e.g., rear portion toward motor 34) having an outer wall 482, a central tubular post (not shown) configured to receive an axle 72 of the vehicle, and support walls (not shown) extending between the central post and outer wall 482. The first portion 480 has a profile generally corresponding to the profile of the drive wheel 76. More particularly, the outer wall 482 includes undulations along its circumference arranged such that the first portion 480 may be slidingly engaged with the drive wheel 76 (e.g., inside of drive wheel 76). The undulations in the drive wheel 76 and first portion 480 of the drive adaptor 478 are configured to transmit the torque of the drive wheel 76 to the drive adaptor 478 through an interference relationship between the undulations.

The drive adaptor 478 further includes a second portion 484 (e.g., front portion away from motor 34) having an outer peripheral wall 486, a central tubular post 488 configured to receive the axle 72, and generally radial support walls 490 extending between the central post 488 and outer wall 486 for increasing the strength of the drive adaptor 478. The outer wall 486 includes a plurality of recesses 492 formed therein, the purpose of which is substantially similar to that previously described with respect to recesses 92. As discussed in more detail below, the second portion 484 of the drive adaptor 478 is configured to extend within the interior of the canister 431 (FIG. 12) and may subsequently extend within the interior of the wheel 432. As shown, the drive adaptor 478 may further include an intermediate portion 483 extending between the first and second portions 480, 484. The intermediate portion 483 may provide additional length to the drive adaptor 478 such that the first portion 480 may engage with the drive wheel 76 while the second portion 484 extends within the canister 431 and/or the wheel 432.

In an exemplary embodiment, the canister 431 has a multi-part construction primarily including a first (e.g. rear) canister half 493 and a second (e.g. front) canister half 495. The first canister half 493 includes a side wall (not shown), an outer circumferential wall 504, an inner circumferential wall 506 defining an opening 508 through the side wall, and a plurality of posts 510, 560 on a front surface of the side wall. As shown, the first canister half 493 further includes a lock pin assembly cavity 511, the purpose of which will be described below, defined by a protruding wall 513 which interrupts the outer circumferential wall 504. In a similar manner, the second canister half 495 includes a side wall 514, an outer circumferential wall 516 interrupted by a protruding wall 525 defining a lock pin assembly cavity (not shown), an inner circumferential wall 518 defining an opening 520 through the side wall 514, and a plurality of posts 522 on a rear surface of the side wall 514. As shown, the second canister half 495 further includes a plurality of eyelets 527 for facilitating coupling the canister 431 to the wheel 432, as described more fully below. The first and second canister halves 493, 495 are configured to be mated together, in for example an overlapping arrangement, to form the canister 495. In this regard, certain of the posts 510, 522 may be aligned and fasteners 526 used to couple the two canister halves 493, 495 together to thereby form the canister 431.

With specific reference now to FIG. 12, in an exemplary embodiment, the wheel 432 has a multi-part construction primarily including a hollow shell portion 433, a tread 498, and a hub cap 500. The hollow shell portion 433 includes an outer wall 435 and an inner circumferential wall 437 defining a generally cylindrical opening 439 for receiving the canister 431. A plurality of threaded holes 441 for receiving fasteners 443 and associated counterbores 445 are provided along the inner circumferential wall 437, such that the eyelets 527 of the canister 431 may be aligned with the counterbores 445 and the canister 431 may be advanced into the cylindrical opening 439 and fixedly coupled to the wheel 432 via the fasteners 443. In this manner, the canister 431 may be "loaded" into the wheel 432. Though not shown, the hollow shell portion 433 may be dividable into first and second wheel halves, similar to the wheel 32 in the previously described embodiment. The hollow shell portion 433 may define a central groove 528 in the outer wall 435 configured to receive the tread 498 therein. The tread 498 may be formed from a generally resilient material, such as rubber or the like, and enhance traction with the surface on which the vehicle is moving.

The hub cap 500 may be configured as a generally plate-like member 530 having a central opening 532, for purposes to be described below. Not unlike automobile hub caps, the hub cap 500 is configured to have a decorative aspect thereto and further configured to cover certain components of the wheel 432. The hub cap 500 is configured to be coupled to the front side of the wheel 432 (e.g. opposite the motor 34) and thereby enclose the cylindrical opening 439 of the hollow shell portion 433 and the canister 431 contained therein. In this regard, the hub cap 500 may include one or more through holes 534 (e.g. three through holes) and the wheel 432, and more particularly the hollow shell portion 433, may include a corresponding number of threaded holes 536, such that fasteners 537 may be inserted through the through holes 534 of the hub cap 500 and threaded into the threaded holes 536, thereby securing the hub cap 500 to the wheel 432.

Similar to the previous embodiment, when the wheel 432 is secured to the tricycle, such as by tightening an axle nut 274 onto the axle 72, the second portion 484 of the drive adaptor 478 is generally positioned within the canister 431, and thus the wheel 432, and at least a portion of the first portion 480 extends from the wheel 432 (e.g., independently or via the intermediate portion 483) and is received within the drive wheel 76. More particularly, the second portion 484 of the drive adaptor 478 includes an annular ring 538 which engages against a shoulder 540 adjacent the opening 508 in the side wall of the first canister half 493 and a bearing surface of the drive adaptor 478 may engage with a portion of the first canister half 493 that defines the opening 508. Additionally, the inner circumferential wall 506 of the first canister half 493 generally confronts and surrounds the outer wall 486 of the second portion 484 of the drive adaptor 478 in an engaging or nearly engaging relationship.

As in the previous embodiment and as best shown in FIG. 11, the motor drive selector mechanism 468 further includes a lock pin assembly 550, a selector plate 552, and a control knob in the form of a dial 554 for moving the selector plate 552 in a desired position. Each of these will now be described in detail.

The lock pin assembly 550 includes a generally oblong lock pin housing 556 configured to be fixedly coupled to the canister 431. More particularly, in an exemplary embodiment the housing 556 includes two passages 558 therethrough configured to receive posts 560 extending from the inner surface of the first canister half 493 (e.g. the posts located within the lock pin assembly cavity 511). Fasteners 562 may be used to secure the housing 556 to the posts 560 and thus to the canister 431. Accordingly, the lock pin housing 556 rotates with rotation of the canister 431 and, subsequently, with rotation of the wheel 432. Between the two passages 558 in the housing 556 is an elongate recess (not shown) configured to receive an elongate lock pin 566. The elongate lock pin 566 is movable relative to the housing 556 between a first extended position and a second retracted position. The movement of the lock pin 566 may be generally in a radial direction. In the extended position, the lock pin 566 extends out of the lock pin housing 556. In the retracted position, the lock pin 566 has been moved toward the inside of the housing 556 such that essentially no portion of the lock pin 566, or only a relatively small portion of the lock pin 566, extends from the housing 556. In any event, the amount of the lock pin 566 that extends from the housing 556 is greater in the first position than in the second position.

In an exemplary embodiment, the lock pin 566 may be biased toward the first extended position. In this regard, the lock pin assembly 550 may include one or more springs (not shown) or other resilient members that bias the lock pin 566 toward the first position. In an exemplary embodiment, for example, two springs may be positioned in the recess for biasing the lock pin 566 toward the first position. When the lock pin housing 556 is coupled to the front surface of the first canister half 493, the lock pin 566 is configured to extend through a slot or gap 570 in the inner circumferential wall 506 at least when in the first position of the lock pin 566. The purposes of the spring bias as well as the slot 570 in the circumferential wall 506 are substantially similar to those previously described with respect to the previously described spring bias and slot 170.

Turning now to the selector plate 552, the selector plate 552 includes a generally cylindrical body having a side wall 572, an outer circumferential wall 574, a central tubular post (not shown) defining an opening configured to receive the axle 72, and generally radial support walls (not shown) extending between the central post and the outer wall 574 for increasing the strength of the selector plate 552. The outer wall 574 includes a first recess 580, a second recess 582 circumferentially spaced from the first recess 580, and a cam surface 584 extending between the first and second recesses 580, 582. The first recess 580 has a depth (e.g., in the radial direction) greater than a depth of the second recess 582 (in the radial direction), and the cam surface 584 extends from adjacent a trough of the first recess 580 to adjacent the second recess 582 such that the radial extent of the cam surface 584 increases in a circumferential direction from the first recess 580 toward the second recess 582. The purpose of the cam surface 584 is substantially similar to that of the previously described cam surface 184. Furthermore, a front surface of the side wall 572 includes a cylindrical protrusion 588 and a projection 590 for engaging with recesses (not shown) on the rear side of the side wall 514 of the second canister half 495. The cylindrical protrusion 588 includes an opening 592 sized and shaped to receive the dial 554. For example, the opening 592 may be generally circular with tabs extending radially inwardly so as to receive a dial 554 having a complementary circular shape with grooves extending radially inwardly. Fasteners 594 may be used to secure the dial 554 to the selector plate 552.

Similarly to the previously described wheel 32, when the canister 431 is assembled and loaded into the wheel 432, the selector plate 552 is positioned adjacent, but spaced from, the drive adaptor 478. The selector plate 552 is configured to be movable relative to the drive adaptor 478 and the canister 431 (and subsequently, the wheel 432). More particularly, the selector plate 552 is rotatable relative to the drive adaptor 478 and the wheel 432 between a first motor-engaged position and a second motor-disengaged position. The rotational movement of the selector plate 552 between the first and second positions is achieved manually using the dial 554, which projects through the central opening 532 in the hub cap 500 and is thereby accessible to the user.

Similar to the previous embodiments, in addition to the selector plate 552 being rotationally movable relative to the drive adaptor 478 and the canister 431, the selector plate 552 is also axially movable relative thereto between a first position and a second position. In the first axial position, the selector plate 552 is configured to engage with the canister 431, and more particularly the second canister half 495, to lock the selector plate 552 from rotational movements relative to the second canister half 495. In the second axial position, the selector plate 552 is released from engagement with the second canister half 495 such that the selector plate 552 is permitted to rotate relative to the wheel 432. In the first axial position of the selector plate 552, the selector plate 552 may be axially spaced from the drive adaptor 478 by an amount greater than when the selector plate 552 is in the second axial position.

In an exemplary embodiment, the selector plate 552 may be biased in an outward direction away from the drive adaptor 478. Accordingly, the selector plate 552 may be biased toward the first axial position. In this regard, one end of a spring 595 may extend around the tubular post 488 and engage an abutment on the front side of the adaptor 478. By way of example, the abutment on the drive adaptor 478 may be provided by the radial support walls 490. The other end of the spring 595 may engage an abutment on the rear side of the selector plate 552, such as an abutment provided by the radial support walls (not shown).

The operation of the motor drive selector mechanism 468 and the interaction between the various components is substantially similar to that previously described with respect to FIGS. 6-8B, substituting the canister 431 for the wheel 32, and thus will not be repeated for the sake of brevity. The primary difference is that in embodiments using the canister 431, when the selector plate 552 is rotationally locked in the first motor-driven position, the torque that is applied to the drive adaptor 478 from the motor 34 is transferred to the canister 431 through the lock pin assembly 550, and is subsequently transferred from the canister 431 to the wheel 432 through the eyelets 527. Thus, it will be appreciated that portions of the inner circumferential wall 437 of the wheel 432 which may be in contact with the eyelets 527 via the counterbores 445 may reinforce the eyelets 527 and assist in the transfer of torque from the canister 431 to the wheel 432.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. Thus, the various features of the invention may be used alone or in any combination depending on the needs and preferences of the user.

What is claimed is:

1. A child vehicle, comprising:
    a motor having a drive wheel;
    a wheel selectively operatively coupled to the motor for driving the child vehicle under the power of the motor, the wheel defining a central axis; and
    a motor drive selector mechanism comprising:
        a drive adaptor including a first portion engaged with the drive wheel and a second portion extending toward the interior of the wheel;
        a lock pin assembly operable to rotate with the wheel and having a lock pin movable between an extended position and a retracted position;
        a selector plate rotatable about the central axis between a first motor driven position and a second motor disengaged position, the selector plate includes first and second spaced apart recesses for engaging with the lock pin, the first recess has a depth greater than a depth of the second recess such that the lock pin is in the extended position when in the first recess and the lock pin is in the retracted position when in the second recess; and
        a control knob for moving the selector plate between the first and second positions,
        wherein the motor drive selector mechanism allows the child vehicle to be operated in a first operational mode wherein the wheel is driven by the motor and a second operational mode wherein the wheel is substantially free from drag or resistance due to the motor.

2. The child vehicle of claim 1, wherein rotation of the selector plate moves the lock pin between the extended and retracted positions.

3. The child vehicle of claim 1, wherein the selector plate is positioned within the wheel.

4. The child vehicle of claim 1, wherein the control knob extends outside of the wheel.

5. The child vehicle of claim 1, further comprising a lock mechanism for locking the selector plate in the first and second positions.

6. The child vehicle of claim 1, wherein the vehicle is one of a tricycle or a scooter.

7. The child vehicle of claim 1, wherein the lock pin assembly is coupled to the wheel.

8. The child vehicle of claim 1, wherein the selector plate further includes a cam surface extending between the first and second recesses for facilitating movement of the lock pin between the extended and retracted positions.

9. The child vehicle of claim 1, wherein the second portion of the drive adaptor includes a plurality of recesses, and wherein the lock pin extends into one of the recesses when the selector plate is in the motor driven position.

10. The child vehicle of claim 1, wherein the lock pin is biased toward the extended position.

11. The child vehicle of claim 5, wherein the lock mechanism includes a protrusion extending from a surface of the selector plate for engaging with a recess operable to rotate with the wheel.

12. The child vehicle of claim 1, further comprising a canister positioned internal to the wheel and coupled thereto so as to rotate with the wheel, and wherein the lock pin assembly is coupled to the canister.

13. The child vehicle of claim 12, wherein the lock pin assembly and selector plate are arranged within the canister.

14. A child vehicle, comprising:
    a motor having a drive wheel;
    a wheel selectively operatively coupled to the motor for driving the child vehicle under the power of the motor; and
    a motor drive selector mechanism comprising:
        a drive adaptor including a first portion engaged with the drive wheel and a second portion extending toward the interior of the wheel;
        a lock pin assembly operable to rotate with the wheel and having a lock pin movable radially between an extended position and a retracted position;
        a selector plate movable between a first motor driven position and a second motor disengaged position; and
        a control knob for moving the selector plate between the first and second positions,
        wherein the motor drive selector mechanism allows the child vehicle to be operated in a first operational mode wherein the wheel is driven by the motor and a second operational mode wherein the wheel is substantially free from drag or resistance due to the motor.

15. The child vehicle of claim 14, wherein movement of the selector plate moves the lock pin between the extended and retracted positions.

16. The child vehicle of claim 14, wherein the selector plate is positioned within the wheel.

17. The child vehicle of claim 14, wherein the control knob extends outside of the wheel.

18. The child vehicle of claim 14, further comprising a lock mechanism for locking the selector plate in the first and second positions.

19. The child vehicle of claim 14, wherein the vehicle is one of a tricycle or a scooter.

20. The child vehicle of claim 14, wherein the lock pin assembly is coupled to the wheel.

21. The child vehicle of claim 14, wherein the selector plate includes first and second spaced apart recesses for engaging with the lock pin, and wherein the first recess has a depth greater than a depth of the second recess such that the lock pin is in the extended position when in the first recess and the lock pin is in the retracted position when in the second recess.

22. The child vehicle of claim 21, wherein the selector plate further includes a cam surface extending between the first and second recesses for facilitating movement of the lock pin between the extended and retracted positions.

23. The child vehicle of claim 14, wherein the second portion of the drive adaptor includes a plurality of recesses, and wherein the lock pin extends into one of the recesses when the selector plate is in the motor driven position.

24. The child vehicle of claim 14, wherein the lock pin is biased toward the extended position.

25. The child vehicle of claim 18, wherein the lock mechanism includes a protrusion extending from a surface of the selector plate for engaging with a recess operable to rotate with the wheel.

26. The child vehicle of claim 14, further comprising a canister positioned internal to the wheel and coupled thereto so as to rotate with the wheel, and wherein the lock pin assembly is coupled to the canister.

27. The child vehicle of claim 26, wherein the lock pin assembly and selector plate are arranged within the canister.

* * * * *